(12) United States Patent
Hidaka

(10) Patent No.: US 11,885,608 B2
(45) Date of Patent: *Jan. 30, 2024

(54) ELLIPSOMETER AND INSPECTION DEVICE FOR INSPECTING SEMICONDUCTOR DEVICE HAVING THE SAME

(71) Applicant: SAMSUNG ELECTRONICS CO., LTD., Suwon-si (KR)

(72) Inventor: Yasuhiro Hidaka, Yokohama (JP)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 307 days.

This patent is subject to a terminal disclaimer.

(21) Appl. No.: 17/366,936

(22) Filed: Jul. 2, 2021

(65) Prior Publication Data
US 2022/0003538 A1 Jan. 6, 2022

(30) Foreign Application Priority Data
Jul. 3, 2020 (JP) .................................. 2020-115522
Oct. 23, 2020 (KR) ........................ 10-2020-0138145

(51) Int. Cl.
*G01B 11/06* (2006.01)
*G02B 27/28* (2006.01)
(Continued)

(52) U.S. Cl.
CPC ................ *G01B 11/06* (2013.01); *G02B 3/06* (2013.01); *G02B 5/04* (2013.01); *G02B 5/3025* (2013.01);
(Continued)

(58) Field of Classification Search
CPC ................ G01B 11/06; G01B 2210/56; G01B 11/0641; G02B 3/06; G02B 5/04;
(Continued)

(56) References Cited

U.S. PATENT DOCUMENTS 5,311,285 A * 5/1994 Oshige .................. G01N 21/211
356/369
5,335,066 A * 8/1994 Yamada ............... G01N 21/211
356/369

(Continued)

FOREIGN PATENT DOCUMENTS

JP 63-275912 A 11/1988
JP 7-294455 A 11/1995
(Continued)

*Primary Examiner* — Michael A Lyons
(74) *Attorney, Agent, or Firm* — Sughrue Mion, PLLC

(57) ABSTRACT

An ellipsometer is provided. The ellipsometer includes: a polarizing optical element, comprising a prism, that is configured to split reflected light into two linearly polarized components of light having polarization directions orthogonal to each other, the reflected light generated by reflecting illuminated light, including linearly polarized light that is polarized in one direction, from a measurement surface of a sample; an interference member, comprising at least one body, that is configured to form at least one interference fringe in which the two linearly polarized components of light interfere with each other in directions different from the polarization directions; an image detector configured to detect the at least one interference fringe; and an analysis device including at least one processor, the analysis device configured to calculate ellipsometry coefficients $\Psi$ and $\Delta$ based on the at least one interference fringe that is detected.

20 Claims, 23 Drawing Sheets

(51) Int. Cl.
  *G02B 5/30* (2006.01)
  *G02B 5/04* (2006.01)
  *G02B 27/14* (2006.01)
  *G02B 3/06* (2006.01)
  *G02B 27/30* (2006.01)

(52) U.S. Cl.
  CPC ......... *G02B 27/141* (2013.01); *G02B 27/283* (2013.01); *G02B 27/286* (2013.01); *G02B 27/30* (2013.01); *G01B 2210/56* (2013.01)

(58) Field of Classification Search
  CPC .. G02B 5/3025; G02B 27/141; G02B 27/283; G02B 27/286; G02B 27/30; G02B 27/106; G02B 27/144; G01N 2021/213; G01N 21/21
  See application file for complete search history.

(56) References Cited

U.S. PATENT DOCUMENTS

| | | | |
|---|---|---|---|
| 5,596,411 A | 1/1997 | Fanton et al. | |
| 5,953,137 A | 9/1999 | Sirat et al. | |
| 6,856,384 B1 | 2/2005 | Rovira | |
| 7,489,399 B1* | 2/2009 | Lee | G01N 21/211 356/369 |
| 7,525,649 B1 | 4/2009 | Leong et al. | |
| 7,616,323 B2 | 11/2009 | De Lega et al. | |
| 7,667,841 B2 | 2/2010 | Opsal | |
| 7,724,362 B1 | 5/2010 | Rosengaus | |
| 8,908,180 B2 | 12/2014 | Acher | |
| 10,635,049 B2* | 4/2020 | Sato | G03H 1/0866 |
| 11,193,882 B2* | 12/2021 | Hidaka | G01J 9/02 |
| 2002/0012122 A1 | 1/2002 | Boyd et al. | |
| 2003/0142318 A1 | 7/2003 | Kuiseko | |
| 2009/0066953 A1* | 3/2009 | Horie | G01B 11/0641 356/369 |
| 2014/0168637 A1* | 6/2014 | Wan | G01N 21/45 356/73 |
| 2019/0107384 A1* | 4/2019 | Ygartua | G01B 11/0625 |

FOREIGN PATENT DOCUMENTS

| | | |
|---|---|---|
| JP | 11-83460 A | 3/1999 |
| JP | 2000-65531 A | 3/2000 |

* cited by examiner

ELLIPSOMETER AND INSPECTION DEVICE FOR INSPECTING SEMICONDUCTOR DEVICE HAVING THE SAME

CROSS-REFERENCE TO THE RELATED APPLICATIONS

This application claims the benefit under 35 USC 119(a) of Korean Patent Application No. 10-2020-0138145 filed on Oct. 23, 2020 in the Korean Intellectual Property Office and Japanese Patent Application No. 2020-115522 filed on Jul. 3, 2020 in the Japanese Patent Office, the disclosures of which are incorporated herein by reference in their entireties.

BACKGROUND

1. Field

Embodiments of the present disclosure relate to an ellipsometer and an inspection device for inspecting a semiconductor device having the same.

2. Description of Related Art

Since 1975, when it was made possible to automatically measure a thickness of a measurement target using ellipsometry, spectroscopic ellipsometry, which measures the thickness of an object using multiple wavelengths with a significantly reduced measurement time and significantly improved accuracy, has also been put to practical use. Since then, spectroscopic ellipsometry has been widely used in a semiconductor manufacturing process due to a property of non-destructively measuring a thin film or a microstructure, such spectroscopic ellipsometry may accurately measure a dimension such as a thickness of the film and an optical constant such as a refractive index. Even now, such spectroscopic ellipsometry is used to complement a scanning electron-beam microscope (SEM) or an atomic force microscope (AFM) with an optical critical dimension (OCD) measurement device that measures a dimension of the microstructure in which a circuit pattern on a wafer has a line width of 10 nm or less.

Over about the last 10 years, a semiconductor circuit structure has progressed to be three-dimensional and to be more complex such as a FinFET in a logic semiconductor and three-dimensional (3D)-NAND in a memory. Most of the OCD measurement devices may use spectral ellipsometry as the measurement principle thereof. To obtain a dimension of a semiconductor circuit structure or an optical constant of a constituent material, the measurement target, the OCD measurement device may obtain a solution by generating a model, using the dimension or the optical constant, i.e. the measurement target, as a floating parameter, and then fit the model to a measurement result. Therefore, if the measurement target has a complex structure, the number of floating parameters thereof may be increased. For example, it may be required to use about 20 to 30 floating parameters to measure the FinFET using the OCD measurement device. In the ellipsometry, two values, $\Psi$ and $\Delta$, may generally be obtained as ellipsometry coefficients, each of which is a measurement result, and both $\Psi$ and $\Delta$ may each have wavelength dependence. Accordingly, in the spectral ellipsometry, the ellipsometry coefficients may be expressed as $\Psi(\lambda)$ and $\Delta(\lambda)$.

In order to obtain a solution of the dimension by fitting the model to the measurement result, it may be required to obtain at least more ellipsometry coefficients $\Psi$ and $\Delta$ than the number of the floating parameters by the measurement. However, as a problem that occurs when the number of the floating parameters is high, the fitting may converge with a combination of the floating parameters, which is different from the actual dimension. This problem may be referred to as coupling, and to avoid this problem, it may be effective to perform fitting by measuring the ellipsometry coefficients $\Psi$ and $\Delta$ which have different dependencies on the floating parameters. Therefore, the ellipsometry measurement may be performed using not only the wavelength but also an incidence angle and an incidence direction under different conditions, and the fitting of the model may use the ellipsometry coefficients $\Psi$ and $\Delta$, which have different dependencies on the floating parameter.

When performing the ellipsometry measurement, it is possible to maximize sensitivity of the ellipsometry measurement by using Brewster's angle, in which P-polarized light has a reflectivity of zero, for the incidence angle. The Brewster's angle may roughly be 65 degrees to 75 degrees in the semiconductor circuit structure. In such an optical system of oblique incidence, it may be required to satisfy the Scheimpflug principle based on a width of a field of view. A certain restriction may thus be required in configuring the optical system such as a lens design and an incidence angle of the camera. In addition, the OCD measurement device may also partially use a measurement method known as Mueller matrix ellipsometry which is used to evaluate a structure of an anisotropic material. The Muller matrix ellipsometry is a representation of the response function of a polarization state of reflected light to illuminated light in a matrix of 4 rows and 4 columns. In order to obtain the Muller matrix ellipsometry, it may be required to measure the polarization states of the reflected light when several types of illuminated light in different polarization states are incident on the semiconductor circuit structure. The Muller matrix is recognized as one of the most effective ways to avoid the coupling when measuring the dimension of the semiconductor circuit structure. However, the Muller matrix may require a measurement time equivalent to several times that of the conventional ellipsometry.

Despite such a need for measurement accuracy, the ellipsometry measurement including the Mueller matrix ellipsometry or the spectral ellipsometry used in the OCD measurement device in the semiconductor manufacturing process may require the measurement to be performed in a very short time. For example, in measuring an entire wafer, a permissible measurement time per sheet may be at most tens of seconds. In such a short time, it may only be possible to measure a very limited region on the wafer. Therefore, the OCD measurement device in the semiconductor manufacturing process may be required to measure the ellipsometry coefficients $\Psi$ and $\Delta$ or the Mueller matrix under more measurement conditions in a short time with high measurement accuracy.

SUMMARY

An ellipsometer used in an optical critical dimension (OCD) measurement device in a semiconductor manufacturing process may typically require a measurement time of one second to several seconds to measure one point. Here, a large number of measurement points may be required within a modulation period set by a rotating compensator or a phase modulating element commonly used in the ellipsometer. Furthermore, in performing a spectroscopic measurement, it may be required to measure an amount of light split by each wavelength in a dispersion element such as a diffraction grating with a high signal-to-noise (S/N) ratio. In performing the Muller matrix ellipsometry, it may be required to change illuminated light to have several types of polarization. Accordingly, in order to inspect the entire wafer in the manufacturing process, it may only be possible to measure a few to tens of points within the wafer. In some cases, yield deterioration due to a partial change in the thickness of a film or a change in the width of a line, within the wafer may thus be overlooked.

In order to increase the measurement points within the wafer by decreasing the measurement time of the spectral ellipsometry, it may be required to increase the speed of a moving part such as the rotating compensator. However, it may be difficult to improve throughput thereof in measuring ellipsometry coefficients Ψ and Δ for an OCD measurement and the like as unstability or heat generation thereof becomes an obstacle.

It is also possible to use an optical system satisfying the Scheimplug principle. Such an optical system may reduce the numerical aperture (NA) of an illumination optical system or condensing optical system and thus have low position resolution. Instead, the optical system may improve throughput thereof by simultaneously measuring multiple points within a wide field of view by using an image detector. In using such an optical system, a frame rate of the image detector or an amount of light received may be limited, and thus it may be required to measure an image under each condition of the illuminated light having multiple wavelengths or multiple polarization states. Accordingly, an effect of improving the throughput may be limited.

Example embodiments provide an ellipsometer capable of improving throughput thereof in measuring the ellipsometry coefficients Ψ and Δ, and an inspection device for inspecting a semiconductor device.

As a conventional basic method of measuring ellipsometry, it is necessary to first obtain a Stokes parameter. Accordingly, it is necessary to "measure light intensity under multiple conditions in which the angle of a polarizer or compensator is changed." An example embodiment in the present disclosure is based on a different approach: "Calculating the intensity ratio and phase difference of light in two polarization states by measuring an interference fringe."

For this measurement, for example, an example embodiment in the present disclosure may illuminate a sample with fully polarized illuminated light, and split light reflected from the sample into two orthogonal linear polarizations. Then, the optical system may be disposed so that the same beams before the division of the reflected light overlap each other on the image detector again. A Nomarski prism may be an ideal polarizing element to realize this division. However, it is possible to use a Willaston prism or a Rochon prism, depending on a difference in the spatial coherence of an illumination area or light source on the sample.

An ellipsometer according to an example embodiment in the present disclosure may use a white light source as a light source and may allow the illuminated light to be transmitted through a polarizer or a wave plate in an illumination optical system again. Accordingly, the illuminated light may be formed of linearly polarized light or elliptically polarized light of fully polarized light. The illuminated light on the sample may be focused as a point. Meanwhile, spatial coherence thereof at a pupil position in the light-receiving optical system may be changed based on a size of this illumination area. Here, the pupil position of the light-receiving optical system may be defined as a surface perpendicular to an optical axis including a point at which light beams parallel to each other converge on the sample in the light-receiving optical system, and a pupil space may be defined as a space interposed by lens or a curved mirror including the pupil position.

The measurement may be performed in an inclined optical system in which the optical axis of the illumination optical system is inclined with respect to a normal direction of a measurement surface of the sample. The illuminated light may illuminate a region having the shape of a line extending in a direction perpendicular to the optical axis on the measurement surface, and the illuminated light reflected from the measurement surface may be incident on the light-receiving optical system whose optical axis is inclined at the same angle opposite to the illumination optical system. The light-receiving optical system may allow the light to become parallel light in the pupil space, an image of the light-receiving detector to be disposed at the pupil position within an incident plane, and the image of the light-receiving detector to be disposed in a position of an image of the sample within a surface including the optical axis of the light-receiving optical system and perpendicular to the incident plane by including a cylindrical lens or a toroidal mirror.

The portions of light that become the parallel portions of light in the pupil space in the incident plane may be split so that the P-polarized light and S-polarized light travel at different angles within the incident plane by a polarizing optical element such as the Normaski prism, and may overlap each other at the same point on the image detector again. A polarizing plate having a transmission axis at an angle in the middle of polarization directions of the split P-polarized light and S-polarized light may be installed between the image detector and the Nomaski prism. The P-polarized light and S-polarized light may temporarily interfere with each other after being transmitted through the polarizing plate and form an interference fringe along the incident plane on the image detector. The polarizing plate may be disposed in front of the detector like an analyzer of the conventional ellipsometer, which has a purpose completely different from that of the conventional analyzer, i.e. to allow the P-polarized light and the S-polarized light to temporarily interfere with each other, in which two polarization directions are orthogonal to each other. By the above disposition, the P-polarized light and the S-polarized light may form the interference fringe due to mutual interference on the image detector. Within the surface perpendicular to the incident plane, a light-receiving surface of the image detector may be in a conjugated relationship (i.e. relationship between the object and the image) with the sample, and the image of the sample may be formed thereon. Therefore, this direction may include position information of the sample based on an illumination area on a line.

According to one or more embodiments, an ellipsometer is provided. The ellipsometer includes a polarizing optical element, comprising a prism, that is configured to split reflected light into two linearly polarized components of light having polarization directions orthogonal to each other, the reflected light generated by reflecting illuminated light, including linearly polarized light that is polarized in one direction, from a measurement surface of a sample; an interference member, comprising at least one body, that is configured to form at least one interference fringe in which the two linearly polarized components of light interfere with each other in directions different from the polarization directions, an image detector configured to detect the at least one interference fringe; and an analysis device including at least one processor, the analysis device configured to calculate ellipsometry coefficients Ψ and Δ based on the at least one interference fringe that is detected.

According to one or more embodiments, an inspection device for inspecting a semiconductor device may be provided. The inspection device includes the ellipsometer.

BRIEF DESCRIPTION OF DRAWINGS

The above and other aspects, features, and advantages of embodiments of the present disclosure will be more clearly understood from the following detailed description, taken in conjunction with the accompanying drawings, in which.

DETAILED DESCRIPTION

Hereinafter, example embodiments will be described with reference to the accompanying drawings.

Figure 1:
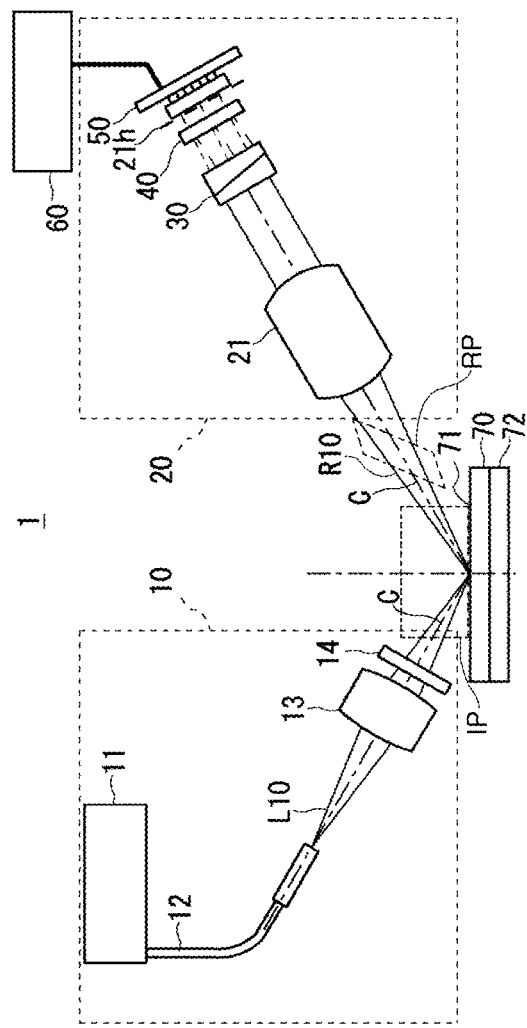
FIG. 1 is a side view illustrating an ellipsometer according to a first example embodiment.
Figure 2:
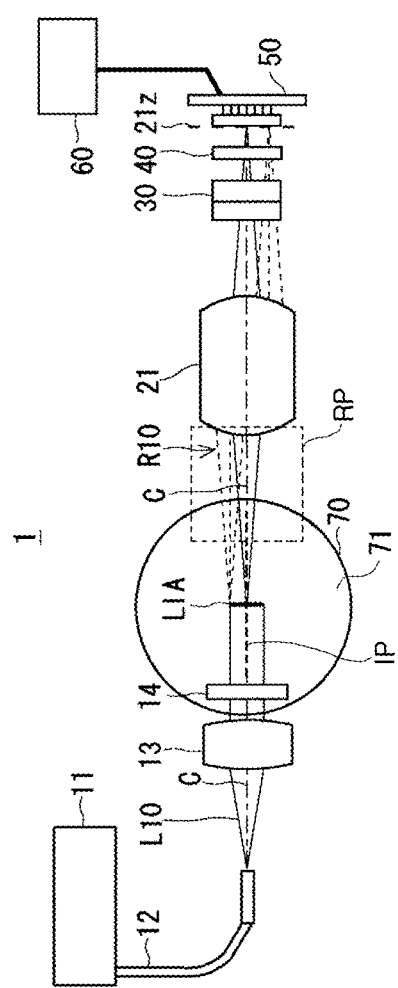
FIG. 2 is a top view illustrating the ellipsometer according to the first example embodiment.

The description describes an ellipsometer according to an example embodiment. FIG. 1 is a side view illustrating an ellipsometer according to an example embodiment. FIG. 2 is a top view illustrating the ellipsometer according to the first example embodiment.

As shown in FIGS. 1 and 2, an ellipsometer 1 may include an illumination optical system 10, a light-receiving optical system 20 and an analysis device 60. For example, the illumination optical system 10 may include a light source 11, a fiber 12, an illumination lens 13, and a polarizer 14. For example, the light-receiving optical system 20 may include a light-receiving lens 21, a polarizing optical element 30, an interference member 40, and an image detector 50.

The ellipsometer 1 may allow an illuminated light L10 to be incident on a measurement surface 71 of a sample 70, and receive reflected light R10 generated by reflecting the illuminated light L10 from the measurement surface 71, thereby measuring ellipsometry coefficients Ψ and Δ. For example, the sample 70 may be a wafer including various films or wiring structures. However, the wafer is only an example embodiment. The sample 70 may not be limited to the wafer, and may be a solid material such as crystal. Meanwhile, the sample 70 may be disposed on a stage 72 moved in a scanning direction parallel to an incident surface and the measurement surface 71. The incident plane IP refers to a plane that includes an optical axis of the illuminated light L10 and the reflected light R10. The incident plane IP may be perpendicular to the measurement surface 71. A reflective plane RP refers to a plane that includes the optical axis of the reflected light R10 and is perpendicular to the incident plane IP.

The ellipsometer 1 may perform a measurement in an inclined optical system in which an optical axis C of the illumination optical system 10 is inclined with respect to a normal direction of the measurement surface 71 of the sample 70. The illuminated light L10 may illuminate a linear illumination area LIA extending perpendicular to the optical axis C on the measurement surface 71.

The reflected light R10 reflected from the measurement surface 71 may be incident on the light-receiving optical system 20 in which the optical axis C is inclined at the same angle opposite to the illumination optical system 10. In the light-receiving optical system 20, the reflected light R10 may become parallel light in a pupil space within the incident plane IP by the light-receiving lens 21 including a cylindrical lens or a toroidal mirror. The reflected light R10 may be disposed in a pupil conjugate position 21h on the image detector 50. Within the reflective plane RP including the optical axis of the reflected light R10 and perpendicular to the incident plane IP, the image detector 50 may be disposed in a position of an image 21z above the measurement surface 71.

The reflected light R10, which becomes the parallel light in the pupil space within the incident plane IP, may be split so that P-polarized light and S-polarized light travel at different angles within the incident plane IP by the polarizing optical element 30 such as Normaschi prism. In addition, the P-polarized light and S-polarized light of the reflected light R10 may overlap each other at the same point on the image detector 50 again. The interference member 40 such as a polarizing plate having a transmission axis at an angle in the middle of polarization directions of the split P-polarized light and S-polarized light may be installed between the image detector 50 and the polarizing optical element 30.

The P-polarized light and the S-polarized light may temporarily interfere with each other after being transmitted through the interference member 40. The P-polarized light and the S-polarized light may form an interference fringe along the incident plane IP on a light-receiving surface of the image detector 50. The interference member 40 may be disposed in front of the image detector 50 like an analyzer of a general ellipsometer. Therefore, when compared with the analyzer of the general ellipsometer, the ellipsometer of an embodiment of the present disclosure may be different in that the interference member 40 is a component allowing the P-polarized light and the S-polarized light, in which two polarization directions are orthogonal to each other, to temporarily interfere with each other. By the above disposition, the P-polarized light and the S-polarized light may form the interference fringe due to mutual interference on the light-receiving surface of the image detector 50. Within the reflective plane RP perpendicular to the incident plane IP, the light-receiving surface of the image detector 50 may be in a conjugated relationship (i.e. relationship between the object and the image) with the measurement surface 71 of the sample 70. An image of the measurement surface 71 may be formed on the light-receiving surface of the image detector 50. Therefore, the image of the measurement surface 71 may include position information of the measurement surface 71 based on a linear illumination area LIA.

The illumination optical system 10 may illuminate the measurement surface 71 of the sample 70 using the illuminated light L10 including the linearly polarized light. The optical axis C of the illuminated light L10 incident on the measurement surface 71 may be inclined with respect to a normal of the measurement surface 71. Here, "the illuminated light L10 including the linearly polarized light" may indicate that the illuminated light L10 may include not only the linearly polarized light but also another light component that does not significantly impair measurement accuracy. In the same way, "including a first polarized light", "including a second polarized light", "including the P-polarized light" and "including the S-polarized light", may also indicate that the illuminated light L10 may further include another light component that does not significantly impair the measurement accuracy.

The light source 11 may generate the illuminated light L10. The light source 11 may generate the illuminated light L10 to have a wide wavelength for example. The illuminated light L10 generated by the light source 11 may include white light for example. Meanwhile, the illuminated light L10 generated by the light source 11 may not be limited to the white light if the illuminated light L10 includes the wide wavelength. The illuminated light L10 generated from the light source 11 may be incident on the fiber 12.

The fiber 12 may be a light guide member on a cable having one end and another end. The illuminated light L10 incident on the one end of the fiber 12 may be emitted from the other end of the fiber 12. The illuminated light L10 emitted from the other end of the fiber 12 may be incident on the illumination lens 13.

The illumination lens 13 may include the cylindrical lens or the toroidal mirror for example.

The illumination lens 13 may be a combination of a plurality of lenses. For example, the illumination lens 13 may change an angular distribution of the incident illuminated light L10. The illumination lens 13 may illuminate the measurement surface 71 using the illuminated light L10 including the linearly polarized light. For example, the illumination lens 13 may illuminate the measurement surface 71 by condensing the illuminated light L10 emitted from the other end of the fiber 12 on a line. The illumination lens 13 may condense the illuminated light L10 to a point when viewed from a side in a direction perpendicular to the incident plane IP, and may convert the illuminated light L10 into the parallel light orthogonal to the reflective plane RP when viewed from above. The illuminated light L10 may illuminate the linear illumination area on the measurement surface 71.

The region on the measurement surface 71, which is illuminated on a line may be referred to as the linear illumination area LIA. The linear illumination area LIA may have the shape of a line extending in a direction orthogonal to the optical axis C of the illuminated light L10. In addition, the linear illumination area LIA may extend in a direction orthogonal to the incident plane IP. Furthermore, the linear illumination area LIA may be orthogonal to the scanning direction.

The polarizer 14 may be disposed between the illumination lens 13 and the sample 70. Therefore, the illumination lens 13 may irradiate the illuminated light L10 to the polarizer 14, and may condense the light on the measurement surface 71 on a line through the polarizer 14.

The illuminated light L10 generated from the light source 11 may be incident on the polarizer 14 through the illumination lens 13. The polarizer 14 may include the polarizing plate for example. The polarizer 14 may allow the illuminated light L10 including the light linearly polarized in one direction to be transmitted therethrough. The polarizer 14 may allow the fully polarized illuminated light L10 to be transmitted therethrough.

For example, the polarizer 14 may emit the illuminated light L10 which is the linearly polarized light having a polarization direction inclined 45 degrees with respect to the ground to the sample 70. In the ellipsometer 1 of the first example embodiment in the present disclosure, the optical axis C of the illuminated light L10 incident on the measurement surface 71 of the sample 70 and the optical axis C of the reflected light R10 reflected from the measurement surface 71 may be inclined with respect to the normal of the measurement surface 71.

The light-receiving lens 21 may allow the reflected light R10 obtained by reflecting the illuminated light L10 including the linearly polarized light from the measurement surface 71 of the sample 70 to be transmitted therethrough. The light-receiving lens 21 may include the cylindrical lens or the toroidal mirror for example. The light-receiving lens 21 may be a combination of a plurality of lenses. When viewed from the side, the light-receiving lens 21 may allow the reflected light R10 to be transmitted therethrough as the parallel light. When viewed from above, orthogonal to the reflective plane RP, in the light-receiving lens 21, an image of the linear illumination area LIA may be disposed on the image detector 50. The light-receiving lens 21 may allow the reflected light R10 to be transmitted therethrough and to be incident on the polarizing optical element 30.

The illuminated light L10, which illuminates the measurement surface 71 of the sample 70, may include the linearly polarized light in the one direction.

The illuminated light L10, which includes a linearly polarized light in the one direction, may be incident on the measurement surface 71 of the sample 70 while being condensed to a line. Therefore, if the illuminated light L10 is the fully polarized and linearly polarized light whose optical axis C is inclined with respect to the measurement surface 71, the illuminated light L10 may include both a P-polarized light portion and a S-polarized light portion depending on an orientation in which the illuminated light L10 is incident on the measurement surface 71. The S-polarized light portion of the illuminated light L10 may be reflected as the S-polarized light. The P-polarized light portion of the illuminated light L10 may be reflected as the P-polarized light. Therefore, the reflected light R10 reflected from the measurement surface 71 of the sample 70 may include light of the P-polarized light and the S-polarized light on the measurement surface 71.

The light-receiving lens 21 may allow the reflected light R10 including the first polarized light in a first direction and the second polarized light in a second direction, different from the first direction with respect to the measurement surface 71, to be transmitted therethrough. The reflected light R10 may be the light generated by reflecting the illuminated light L10 including the linearly polarized light from the measurement surface 71 of the sample 70. For example, the first polarized light may be the S-polarized light on the measurement surface 71, and the second polarized light may be the P-polarized light on the measurement surface 71.

The reflected light R10 transmitted through the light-receiving lens 21 may be incident on the polarizing optical element 30. The polarizing optical element 30 may include, for example, a Normaski prism. However, the polarizing optical element 30 may not be limited to the Normaski prism, and may include a Willaston prism or a Rochon prism.

The polarizing optical element 30 may split the reflected light R10 obtained by reflecting the illuminated light L10 including the linearly polarized light from the measurement surface 71 of the sample 70 into two linearly polarized components of light having polarization directions orthogonal to each other. For example, the polarizing optical element 30 may split the two linearly polarized components of light within the incident plane IP. The polarization directions perpendicular to each other split by the polarizing optical element 30 may respectively be X and Y directions. In this case, a surface extending in the X and Y directions and the optical axis C of the reflected light R10 may be orthogonal to each other. The polarizing optical element 30 may split the reflected light R10 into the linearly polarized light in the X direction and the linearly polarized light in the Y direction. For example, the polarizing optical element 30 may split the reflected light R10 including the light which used to be the P-polarized light and the light which used to be the S-polarized light on the measurement surface 71 into the P-polarized light and the S-polarized light.

The polarizing optical element 30 may deflect the linearly polarized light in the X direction and the linearly polarized light in the Y direction which are split from each other, and emit the light, such that the linearly polarized light in the X direction and the linearly polarized light in the Y direction are provided to the same point on the image detector 50. The reflected light R10 emitted from the polarizing optical element 30 may be incident on the image detector 50 through the interference member 40.

Figure 3:
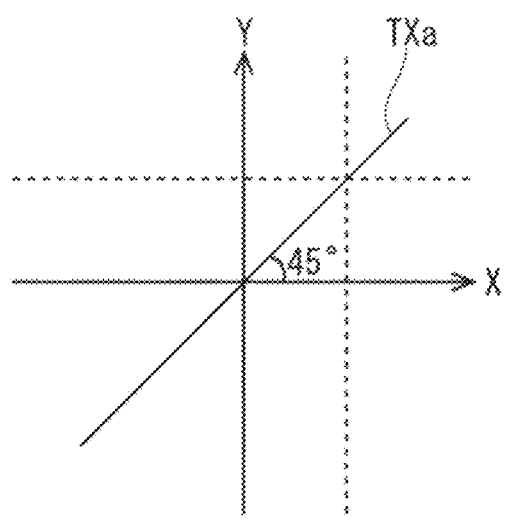
FIG. 3 is a view illustrating that linearly polarized light is transmitted through an interference member in the ellipsometer according to the first example embodiment.

With reference to FIG. 3, the interference member 40 such as the polarizing plate may allow components of linearly polarized light, that are polarized in directions each inclined by a predetermined angle with respect to the polarization directions in the X and Y directions and split by the polarizing optical element 30, to be transmitted therethrough. An axis in the direction inclined by the predetermined angle may be referred to as a transmission axis TXa. The transmission axis TXa may be a 45 degree direction for example. For example, the interference member 40 may allow the components of the linearly polarized light, that are polarized in the directions each inclined by 45 degrees with respect to the polarization directions in the X and Y directions and split by the polarizing optical element 30, to be transmitted therethrough.

Therefore, the interference member 40 may allow the polarization component inclined with respect to the X direction by 45 degrees among the linearly polarized light having the polarization direction in the X direction to be transmitted therethrough. In addition, the interference member 40 may allow the polarization component inclined with respect to the Y direction by 45 degrees among the linearly polarized light having the polarization direction in the Y direction to be transmitted therethrough. Therefore, two linearly polarized components of light that are orthogonal to each other may transmit through the interference member 40 to be emitted as the polarization components polarized to the transmission axis TXa. Therefore, the two linearly polarized components of light that are orthogonal to each other may temporarily interfere with each other.

As such, the interference member 40 may include the polarizing plate allowing the two linearly polarized components of light polarized in directions different from the polarization directions to be transmitted therethrough. Accordingly, the interference member 40 may form the interference fringe in which the two linearly polarized components of light interfere with each other in directions different from the polarization directions. The reflected light R10 including the corresponding polarization component emitted from the interference member 40 may be incident on the image detector 50.

The image detector 50 may receive the reflected light R10. The light-receiving surface of the image detector 50 may be disposed at the pupil conjugate position 21h conjugated to a pupil position of the light-receiving lens 21 when viewed from the side orthogonal to the incident plane. In addition, the light-receiving surface of the image detector 50 may be disposed at the position of an image 21z above the measurement surface 71 of the sample 70 when viewed from above, orthogonal to the reflective plane. The reflected light R10 may include the polarization components of the same direction in the two linearly polarized components of light that are polarized orthogonal to each other. Therefore, the reflected light R10 may provide the interferences on the image detector 50.

Figure 4:
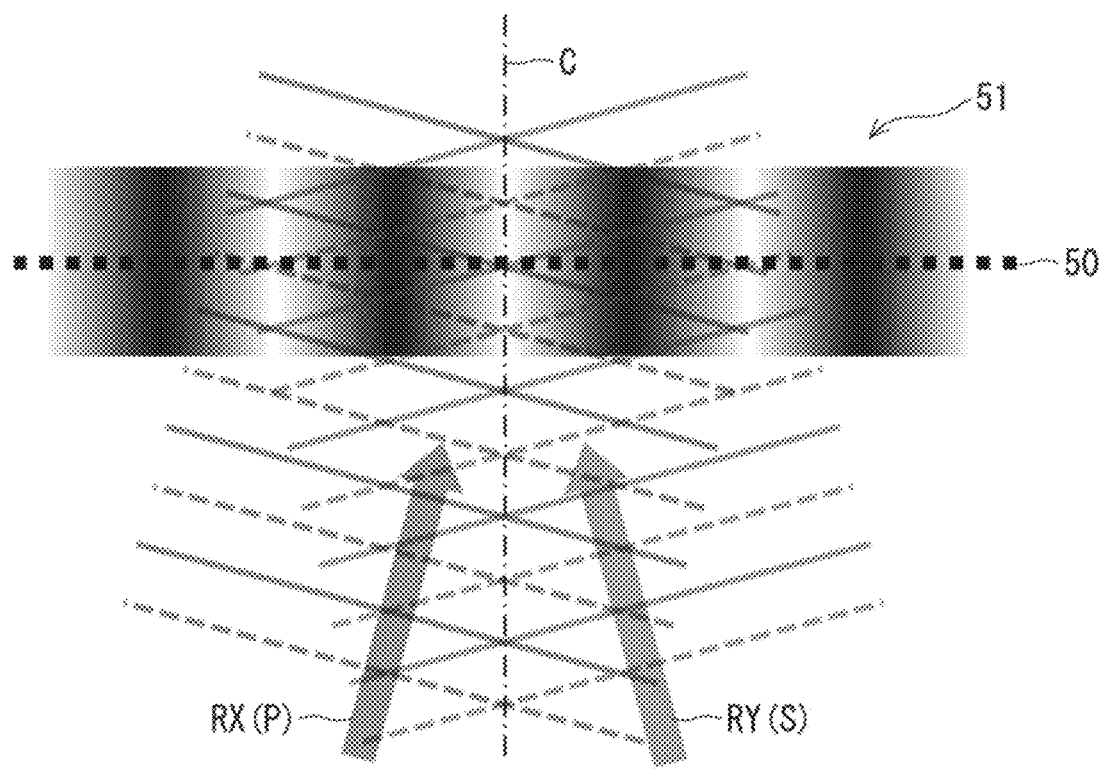
FIG. 4 is a view illustrating that a wavefront of each linearly polarized light included in reflected light is incident on an image detector when viewed in a direction parallel to an extending direction of an incident plane in the ellipsometer according to the first example embodiment.
Figure 5:
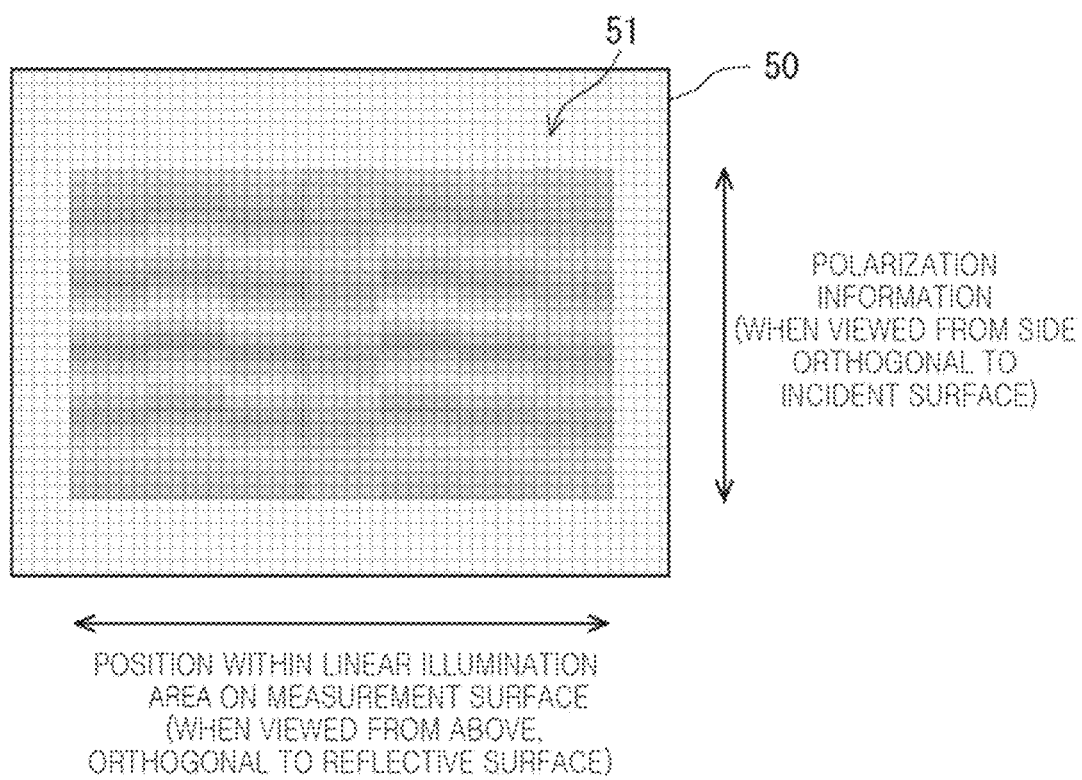
FIG. 5 is a view illustrating that an interference fringe is generated on the image detector by interferences in the reflected light in the ellipsometer according to the first example embodiment.

FIG. 4 is a view illustrating that a wavefront of each linearly polarized light included in the reflected light R10 is incident on the image detector 50 when viewed from the side in the direction perpendicular to the incident surface in the ellipsometer according to the first example embodiment. FIG. 5 is a view illustrating that the interference fringe is generated on the image detector 50 by the interferences in the reflected light R10 in the ellipsometer according to the first example embodiment.

As shown in FIG. 4, the reflected light R10 including two linearly polarized components of light RX (e.g. P-polarized light) and light RY (e.g. S-polarized light) which are split by the polarizing optical element 30 may transmit through the interference member 40 and form an interference fringe 51 on the image detector 50. The two linearly polarized components of light RX and light RY may be the P-polarized light and the S-polarized light for example. As shown in FIG. 5, the image detector 50 may detect the interference fringe 51 of each polarization component in the reflected light R10 that is transmitted through the interference member 40. The interference fringe 51 may be formed on the measurement surface 71 by the reflected light R10 including the P-polarized light and the S-polarized light. A longitudinal direction of the interference fringe 51 in FIG. 5 may show polarization information when viewed from the side in the direction orthogonal to the incident plane. A transverse direction of the interference fringe 51 in FIG. 5 may show a position of the linear illumination area LIA on the measurement surface 71 when viewed from above, orthogonal to the reflective plane.

As described above, in the ellipsometer 1, the reflected light R10 reflected from the measurement surface 71 may transmit through the light-receiving lens 21 of the light-receiving optical system 20, and may be incident on the polarizing optical element 30 such as the Normaschi prism. In addition, the reflected light R10 may be angularly split into the P-polarized light and the S-polarized light within the incident plane. The reflected light R10, that is split, may have temporal interferences by being transmitted through the interference member 40 such as the analyzer having the transmission axis TXa of 45 degrees. In this manner, the ellipsometer 1 may form the interference fringe 51 on the image detector 50.

The analysis device 60 may include an information processing device such as a personal computer (PC) and a server for example. The analysis device 60 may receive image information corresponding to the interference fringe 51. The analysis device 60 may calculate the ellipsometry coefficients $\Psi$ and $\Delta$ based on the interference fringe 51 detected by the image detector 50. The analysis device 60 may include at least one processor and memory storing computer instructions. The computer instructions, when executed by the at least one processor, may be configured to cause the analysis device 60 to perform its functions.

Figure 6:
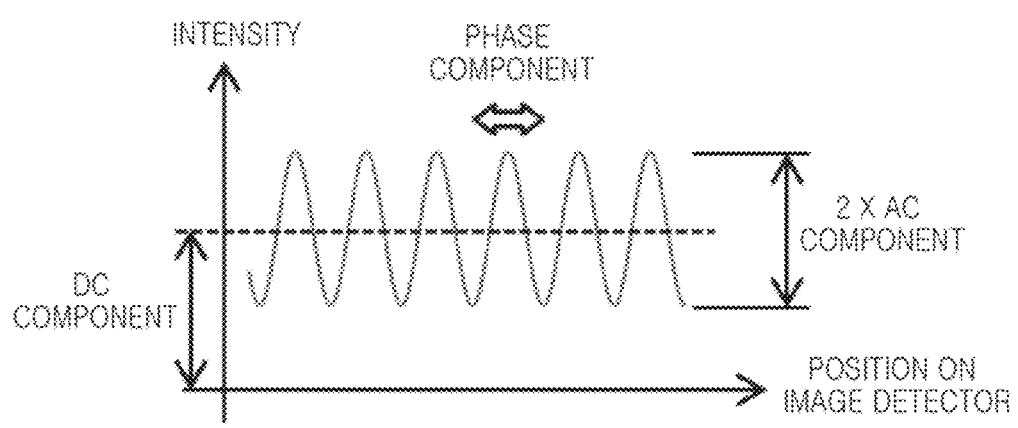
FIG. 6 is a view illustrating intensity of the interference fringe on the image detector in the ellipsometer according to an example embodiment, in which a horizontal axis indicates a position of the interference fringe on a light-receiving surface of the image detector, and a vertical axis indicates the intensity of the interference fringe of the reflected light.

FIG. 6 is a view illustrating intensity of the interference fringe on the image detector 50 in the ellipsometer according to the first example embodiment. For example, a horizontal axis thereof may indicate a position of the interference fringe on the light-receiving surface of the image detector 50, and a vertical axis thereof may indicate the intensity of the interference fringe 51 of the reflected light R10.

As shown in FIG. 6, the analysis device 60 may respectively extract amplitude information and phase information by fitting a periodic function represented by following Equation 1 or Fourier transform based on an intensity distribution of the interference fringe 51 in the linear illumination area LIA. For example, in Equation 1, $E_P$ and $E_S$ may respectively be amplitudes of the electric fields of the P-polarized light and S-polarized light.

$$I_{fringe1} = |E_P|^2 + |E_S|^2 + 2|E_P||E_S|\exp\{i(\delta_P - \delta_S)\} \quad \text{[Equation 1]}$$
$$= |E_P|^2 + |E_S|^2 + 2|E_P||E_S|\exp(i\Delta)$$

An alternating current (AC) component of the interference fringe 51 may be expressed as $2|E_P||E_S|\exp(i\Delta)$, and a phase component of the interference fringe 51 may be $\Delta$ of the ellipsometry coefficient as it is. Meanwhile, the ellipsometry coefficient $\Psi$ may be obtained from contrast information obtained by dividing the AC component of the interference fringe 51 by a direct current (DC) component.

In general, the ellipsometry coefficients $\Psi$ and $\Delta$ may be defined as $r_P$ and $r_{S|}=\tan(\Psi)\exp(i\Delta)$ using $r_{P|}$ and $r_{S|}$ which are complex reflectances for each polarization. Therefore, when using the ellipsometer 1 as a measuring device, $\Psi_{ref}$ and $\Delta_{ref}$ may be obtained first by the above procedure by measuring a material whose optical constant and structure are known. In addition, from the known optical constant and structure, the ellipsometry coefficients $\Psi_{def}$ and $\Delta_{def}$ may be obtained when 1 is each reflectance of both the P-polarized light and the S-polarized light, and zero is the phase difference between the P-polarized light and S-polarized light when reflected. A measurement sample of interest may then be measured, and similarly, it is possible to obtain ellipsometry coefficients $\Psi_{sample}$ and $\Delta_{sample}$. Finally, $\Psi_{actual}$ and $\Delta_{actual}$, defined by $\Psi_{actual}=\Psi_{sample}/\Psi_{def}$ and $\Delta_{actual}=\Delta_{sample}-\Delta_{def}$, may be the ellipsometry coefficients $\Psi$ and $\Delta$ of the sample 70 to be obtained.

In addition, the ellipsometer 1 of the first example embodiment in the present disclosure may simultaneously measure multiple points along the linear illumination area LIA on the measurement surface 71 of sample 70.

Figure 7:
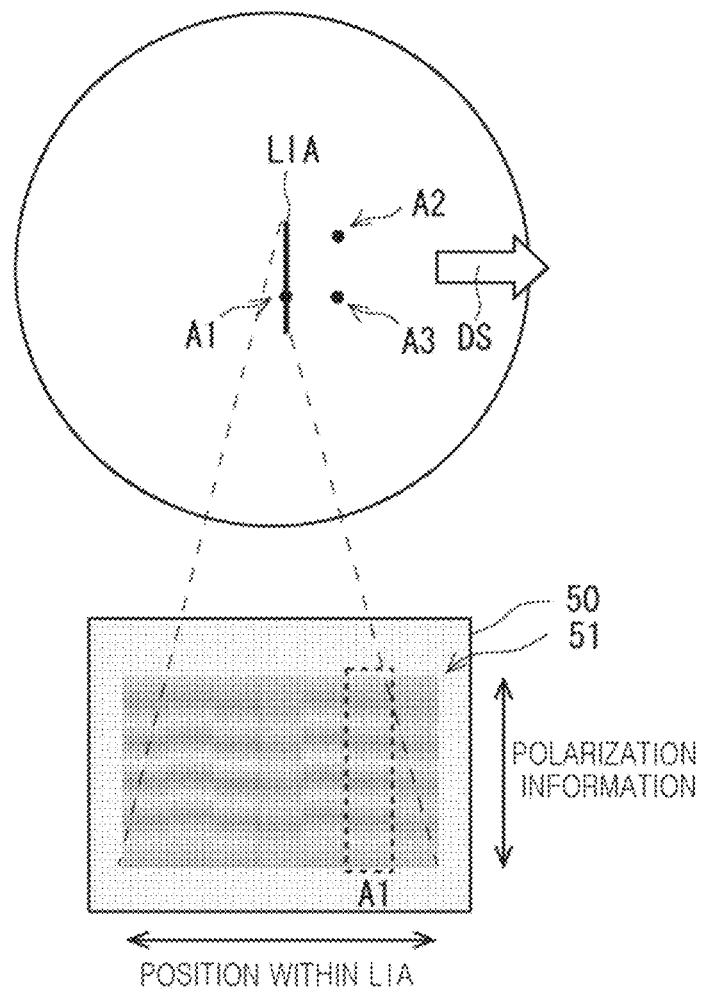
FIG. 7 is a view illustrating a linear illumination area on a measurement surface of a sample and the interference fringe generated by the light reflected from the linear illumination area in the ellipsometer according to the first example embodiment.
Figure 8:
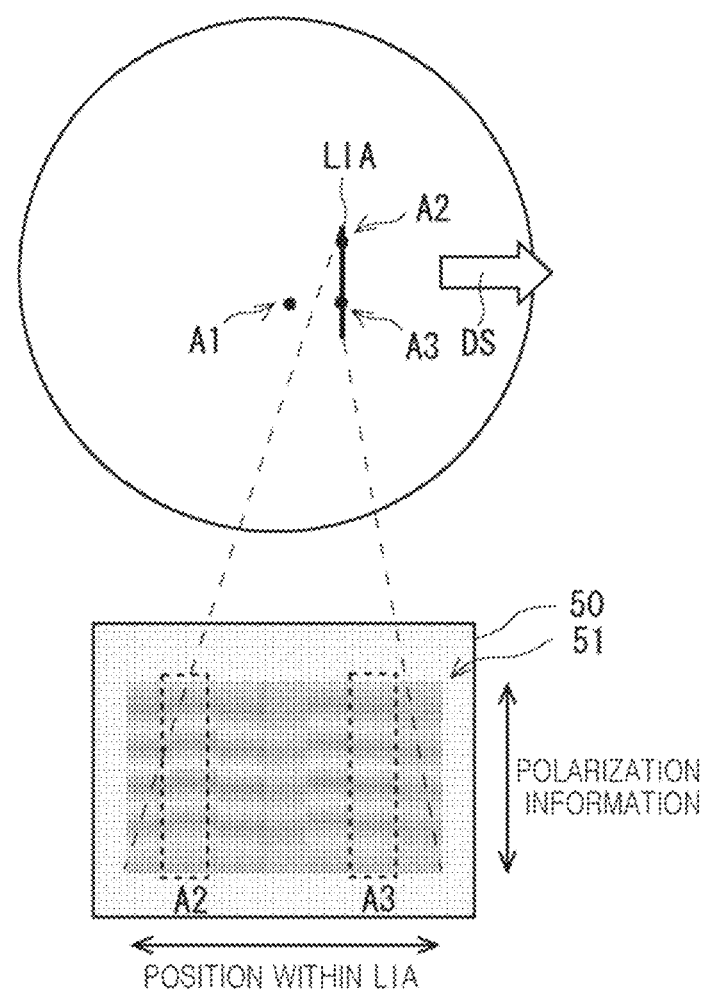
FIG. 8 is a view illustrating the linear illumination area on the measurement surface of the sample and the interference fringe generated by the light reflected from the linear illumination area in the ellipsometer according to the first example embodiment.

FIGS. 7 and 8 are views each illustrating the linear illumination area LIA on the measurement surface 71 of the sample 70 and the interference fringe 51 generated by the reflected light R10 from the linear illumination area LIA in the ellipsometer according to the first example embodiment. FIG. 7 shows the interference fringe 51 at a first time point, and FIG. 8 shows the interference fringe 51 at a second time point. From the first time point to the second time point, the sample 70 may be scanned in the scanning direction DS. Therefore, the image detector 50 may detect the interference fringe 51 scanned in the scanning direction DS.

As shown in FIG. 7, at the first time point, the interference fringe 51 generated by respective points of the linear illumination area LIA including a point A1 on the measurement surface 71 may be measured on the image detector 50. At the second time point, the interference fringe 51 may be detected from the linear illumination area LIA including points A2 and A3 based on the reflected light R10. It is possible to measure a two-dimensional region by performing the scanning on the stage 72 in the scanning direction DS.

The ellipsometer 1 of the first example embodiment in the present disclosure may use the polarizing optical element 30 in measuring the ellipsometry coefficients Ψ and Δ. The polarizing optical element 30 may split the reflected light R10 reflected from the measurement surface 71 of the sample 70 into the two linearly polarized components of light RX and light RY in the polarization directions orthogonal to each other, and may form the interference fringe 51 on the image detector 50 from the two linearly polarized components of light that are split. From the measurement results of the contrast and phase of the interference fringe 51, it is possible to directly measure two independent parameters, i.e. the ellipsometry coefficients Ψ and Δ. Accordingly, it is possible to make it unnecessary to measure a light amount of at least four polarization components of time series using the rotating polarizer or the compensator, which is required by related art embodiments to measure the ellipsometry coefficients Ψ and Δ.

In addition, in the related art measurement of the ellipsometry coefficients Ψ and Δ, the Stokes parameter may be obtained from the light amount of a plurality of different polarized light, and the ellipsometry coefficients Ψ and Δ may then be obtained from the obtained Stokes parameter. In contrast, in the example embodiment of the present disclosure, the ellipsometry coefficients Ψ and Δ may be directly obtained. Therefore, it is possible to perform the measurement in a short time, thereby improving the throughput of an optical critical dimension (OCD) measurement device.

In addition, there are no moving parts when compared with a conventional ellipsometer, and it is thus possible to measure the ellipsometry coefficients Ψ and Δ more stably.

Furthermore, the ellipsometry coefficients Ψ and Δ of the two-dimensional region within the measurement surface 71 may be obtained at a high speed because the illuminated light L10 illuminates the linear illumination area LIA on a line, in combination with scanning of the stage 72 on which the sample 70 is mounted.

In addition, in most of the ellipsometers used in the OCD measurement device, the incidence angle of the illuminated light incident on a measurement surface of a sample may have a value fixed to Brewster's angle. In contrast, the first example embodiment of the present disclosure may make it possible to measure the ellipsometry coefficients Ψ and Δ at an arbitrary incidence angle and incidence direction by disposing the image detector 50 at the pupil conjugate position 21h conjugated to the pupil position of the light-receiving lens 21. Such a configuration may not be easily realized in a configuration of a related art ellipsometer rotating an analyzer thereof and the like.

Therefore, an ellipsometer according to the first example embodiment of the present disclosure may utilize measurement results under more conditions in fitting a model having a microstructure on a wafer. Problems in an OCD measurement device may be increased by coupling in fitting a model having a microstructure on a wafer. However, in the first example embodiment of the present disclosure, it is possible to improve accuracy in measuring a current semiconductor structure, which is an advanced three-dimensional structure, by more measurement conditions.

In addition, it is possible to reduce the linear illumination area LIA of the sample 70 by the illuminated light L10, and the evaluation of the dimensional distribution in a semiconductor chip may also be performed with a higher position resolution. These measurement results may be reflected in lithography, a film formation and an etching process, and the semiconductor manufacturing process may thus be appropriately adjusted. Accordingly, it is possible to improve the yield and productivity in the semiconductor manufacturing.

Furthermore, in the logic, the test pattern for measuring the ellipsometry coefficients Ψ and Δ disposed in the semiconductor chip may be reduced from angles of tens μm to angles of several μm or less. As a result, the region which may be used for a circuit in the semiconductor chip may be increased, thereby reducing a production cost of a semiconductor device.

Figure 9:
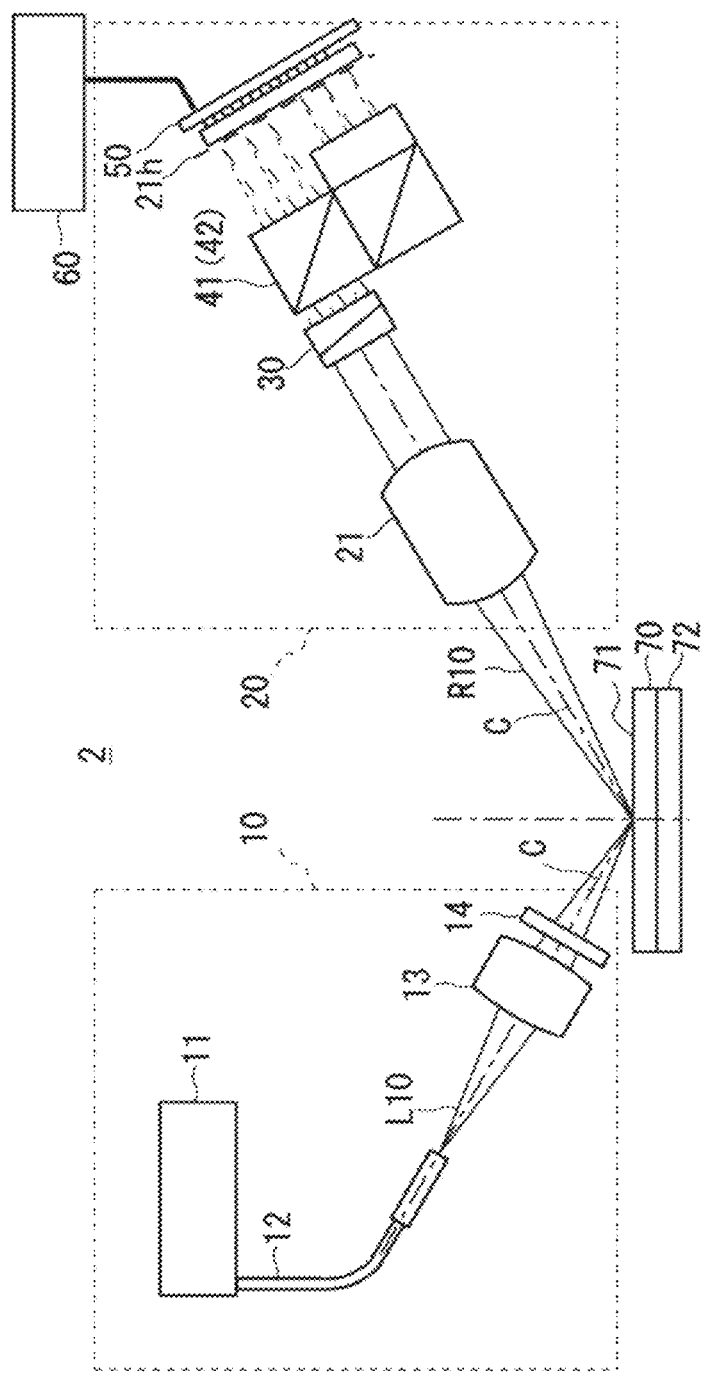
FIG. 9 is a side view illustrating an ellipsometer according to a second example embodiment.
Figure 10:
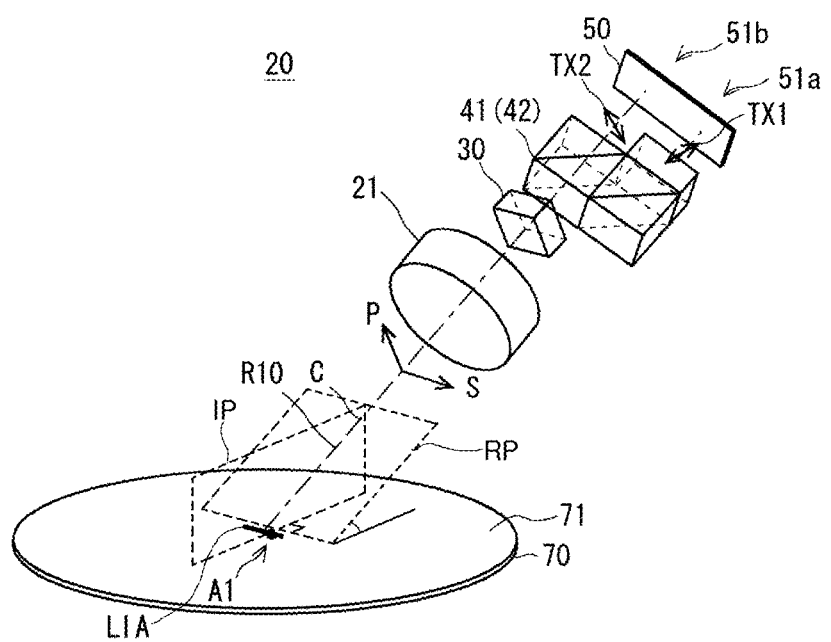
FIG. 10 is a view illustrating a light-receiving optical system in the ellipsometer according to the second example embodiment.
Figure 11:
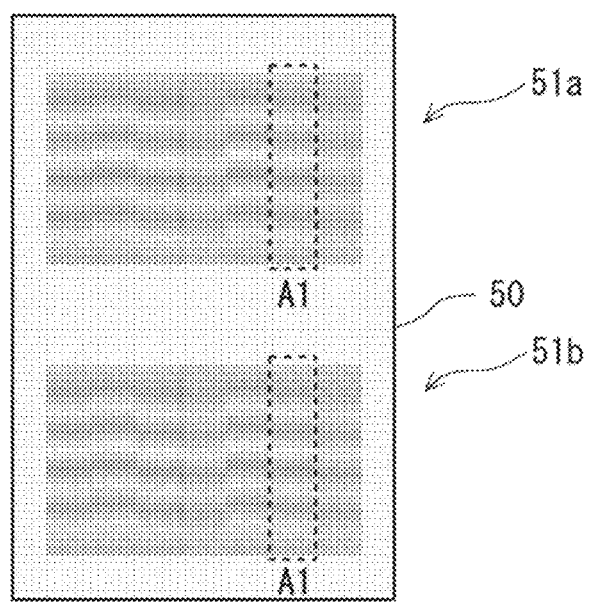
FIG. 11 is a view illustrating an interference fringe of the reflected light interfered on the image detector in the ellipsometer according to the second example embodiment.

Due to these effects of the improved throughput and improved stability, in the semiconductor manufacturing process in which an application of embodiments of the present disclosure is expected, the OCD measurement, which used to have several points within one wafer, may be performed for a circuit line width or a film thickness distribution in a shot on the wafer, in the chip and in a memory-cell. Meanwhile, such a measurement may be used to detect a defect or predict a defect due to a fluctuation within an allowable range, which may contribute to the improved yield and productivity, and reduce the production cost of the semiconductor devices. Next, an ellipsometer 2 according to a second example embodiment may use a polarizing beam splitter instead of the polarizing plate as the interference member 40. FIG. 9 is a side view illustrating an ellipsometer according to the another example embodiment. FIG. 10 is a view illustrating the light-receiving optical system 20 in the ellipsometer according to the second example embodiment. FIG. 11 is a view illustrating an interference fringe of the reflected light R10 interfered on the image detector 50 in the ellipsometer according to the second example embodiment.

As shown in FIGS. 9 through 11, the ellipsometer 2 may include the illumination optical system 10, the light-receiving optical system 20, and the analysis device 60 like the ellipsometer of other example embodiments. The illumination optical system 10 and the analysis device 60 may correspond to those of other example embodiments.

The light-receiving optical system 20 may include the light-receiving lens 21, the polarizing optical element 30 (e.g. at least one prism), an interference member 41 (e.g. at least one body), and the image detector 50. The interference member 41 may include a polarizing beam splitter 42 for example. The ellipsometer 2 of the second example embodiment in the present disclosure may split each of two different polarized light angularly split by a polarizing optical element 31 such as the Normaschi prism into two again using the polarizing beam splitter 42.

As shown in FIG. 11, the ellipsometer 2 may form an interference fringe 51a and an interference fringe 51b on the image detector 50 from the two different polarized light, i.e. the P-polarized light and the S-polarized light, each of which is split into two again using the polarizing beam splitter 42.

For example, if the P-polarized light and the S-polarized light are angularly split within the incident plane IP by the polarizing optical element 30, polarization transmission axes TX1 and TX2 of the polarizing beam splitter 42 may each be made to be an angle between the P-polarized light and the S-polarized light. For example, as shown in FIG. 10, the polarizing beam splitter 42 may be rotated having the optical axis C as a rotation axis thereof. In this case, the polarizing beam splitter 42 may have the two polarization transmission axes TX1 and TX2 orthogonal to each other. The reflected light R10 being transmitted through each of the polarization transmission axes TX1 and TX2 may include both the P-polarized light and the S-polarized light. Accordingly, the reflected light R10 being transmitted through the polarizing beam splitter 42 may form the interference fringe 51a and the interference fringe 51b on the image detector 50.

Figure 12:
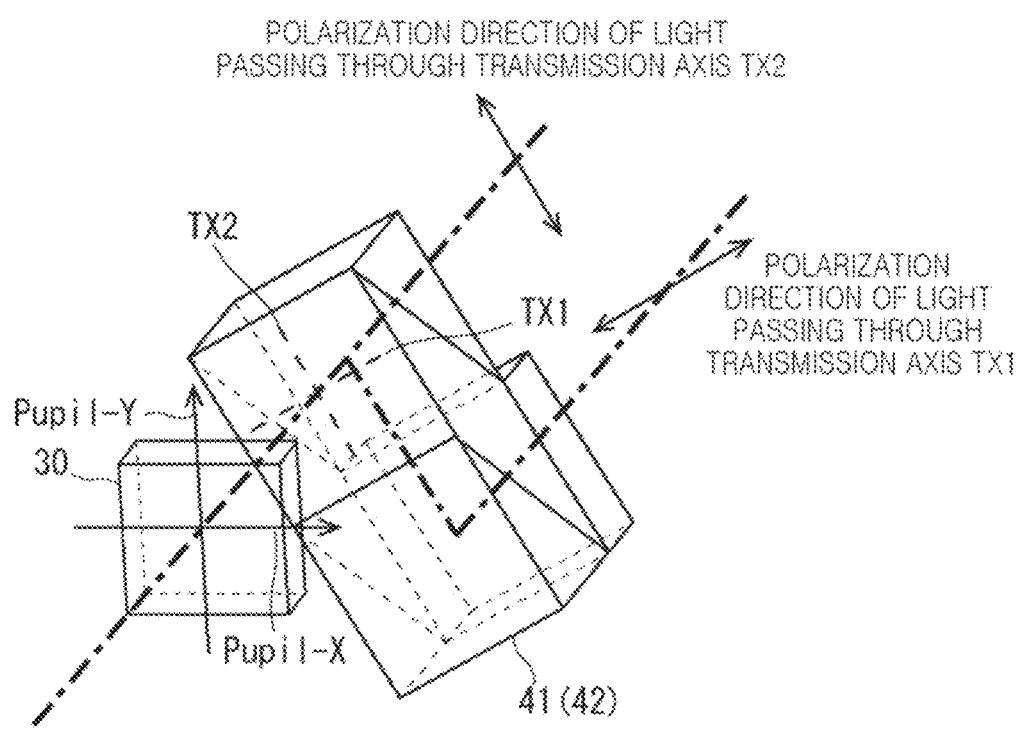
FIG. 12 is a view illustrating a polarizing optical element and a polarizing beam splitter in the ellipsometer according to the second example embodiment.
Figure 13:
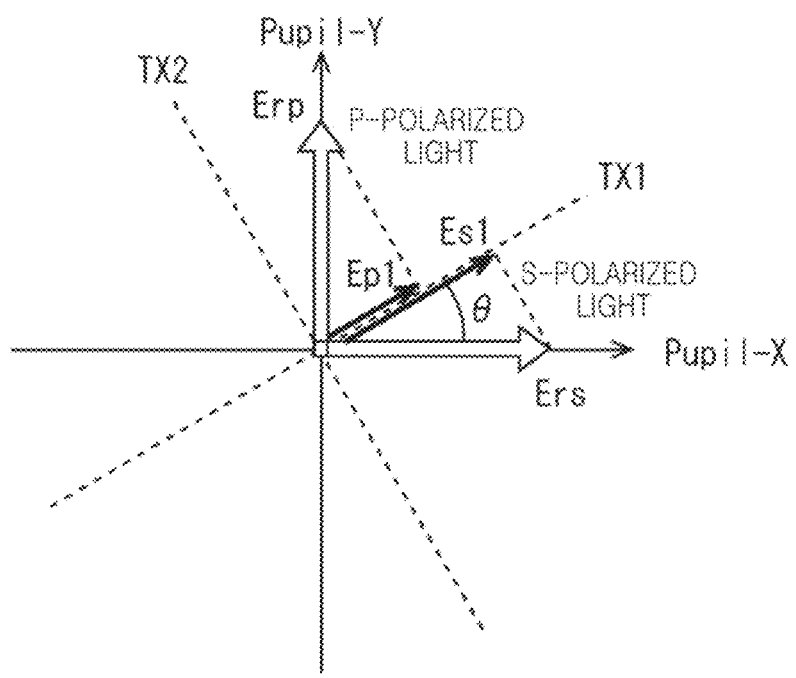
FIG. 13 is a view illustrating linearly polarized light split by the polarizing beam splitter in the ellipsometer according to the second example embodiment.

FIG. 12 is a view illustrating the polarizing optical element 30 and the polarizing beam splitter 42 in the ellipsometer according to the second example embodiment. FIG. 13 is a view illustrating linearly polarized light split by the polarizing beam splitter 42 in the ellipsometer according to the second example embodiment. As shown in FIGS. 12 and 13, the interference member 41 may include the polarizing beam splitter 42 that splits two linearly polarized components of light in a direction of the polarization transmission axis TX1, inclined with respect to each polarization direction by an angle θ, and two linearly polarized components of light in a direction of the transmission axis TX2 inclined with respect to the angle θ at 90 degrees. The image detector 50 may detect the interference fringe 51a of the two linearly polarized components of light in the direction of the polarization transmission axis TX1 and the interference fringe 51b of the two linearly polarized components of light in the direction of the transmission axis TX2.

For example, an XY Cartesian coordinate system may be defined so that a pupil-X axis (Pupil-X) is parallel to the first polarization direction of the S-polarized light and a pupil-Y axis (Pupil-Y) is parallel to the second polarization direction of the P-polarized light. The polarizing beam splitter 42 may be rotated by the angle θ having the optical axis C as a central axis thereof.

If $|E_{rp}|$ is the P-polarized light component of the reflected light R10 reflected from the measurement surface 71 of the sample 70 and $|E_{RS}|$ is the S-polarized light component, components $|E_{p1}|$ and $|E_{s1}|$ which transmit through the polarization transmission axis TX1 of the polarizing beam splitter 42 may respectively be obtained from Equations 2 and 3 below. Here, the angle θ may be determined as a known angle.

$$|E_{p1}| = |E_{rp}| \sin\theta \qquad \text{[Equation 2]}$$

$$|E_{s1}| = |E_{rs}| \cos\theta \qquad \text{[Equation 3]}$$

Here, the P-polarized light component $|E_{rp}|$ and the S-polarized light component $|E_{rs}|$ may interfere with each other as virtual complete coherents. As an example, the AC component and DC component of the light interfering with each other may be expressed as following Equations 4 and 5.

$$AC = 2|E_{rp}||E_{rs}| \qquad \text{[Equation 4]}$$

$$DC = |E_{rp}|^2 + |E_{rs}|^2 \qquad \text{[Equation 5]}$$

In addition, an AC component $AC_1$ of the polarization transmission axis TX1 and a DC component $DC_1$ of the polarization transmission axis TX1 may respectively be expressed as following Equations 6 and 7.

$$AC_1 = 2|E_{p1}||E_{s1}| \qquad \text{[Equation 6]}$$

$$DC_1 = |E_{p1}|^2 + |E_{s1}|^2 \qquad \text{[Equation 7]}$$

Similarly, an AC component $AC_2$ of the transmission axis TX2 and a DC component $DC_2$ of the transmission axis TX2 may be expressed as following Equations 8 and 9.

$$AC_2 = 2|E_{p2}||E_{s2}| \qquad \text{[Equation 8]}$$

$$DC_2 = |E_{p2}|^2 + |E_{s2}|^2 \qquad \text{[Equation 9]}$$

Here, a relationship among the AC component AC and the DC component DC, the AC component $AC_1$ and DC component $DC_1$ of the polarization transmission axis TX1, and the AC component $AC_2$ and DC component $DC_2$ of the transmission axis TX2 may be expressed as following Equations 10 and 11.

$$AC = 2|E_{rp}||E_{rs}| \qquad \text{[Equation 10]}$$
$$= \frac{AC_1}{\sin\theta \cdot \cos\theta} = \frac{AC_2}{\sin\theta \cdot \cos\theta}$$

$$DC = DC_1 + DC_2 \qquad \text{[Equation 11]}$$

However, two solutions may be obtained as shown in Equations 12 and 13 below. The two solutions may correspond to $|E_{rp}|/|E_{rs}|$ and $|E_{rs}|/|E_{rp}|$. If negation of the discrimination of these two values is allowed, Ψ may be obtained from only $AC_1$ and $DC_1$. For example, it may be determined which one is larger among $|E_{rp}|$ and $|E_{rs}|$ using a known analysis.

$$\Psi = \frac{|E_{rp}|}{|E_{rs}|} \qquad \text{[Equation 12]}$$

$$\Psi = \frac{DC}{AC} \pm \sqrt{\left(\frac{DC}{AC}\right)^2 - 1} \qquad \text{[Equation 13]}$$

If it is difficult to determine which one is larger among $|E_{rp}|$ and $|E_{rs}|$ using the known analysis, it may be possible to obtain each of $|E_{rp}|$ and $|E_{rs}|$ from the points where the polarizing beam splitter 42 has the two polarization transmission axes TX1 and TX2 as shown in Equations 14 and 15 below.

$$|E_{rp}| = \frac{DC_1 \cdot \cos^2\theta - DC_2 \cdot \sin^2\theta}{\cos^4\theta - \sin^4\theta} \qquad \text{[Equation 14]}$$

$$|E_{rs}| = \frac{DC_1 \cdot \sin^2\theta - DC_2 \cdot \cos^2\theta}{\sin^4\theta - \cos^4\theta} \qquad \text{[Equation 15]}$$

However, as seen from Equations 14 and 15, if the angle θ is 45 degrees, the denominator becomes zero, and it is thus impossible to obtain the solution. Similarly, if the angle θ is zero degrees or 90 degrees, the AC component $AC_1$ of the polarization transmission axis TX1 and the AC component $AC_2$ of the polarization transmission axis TX2 become zero, and it is thus impossible to obtain the solution of Δ. Therefore, the polarization transmission axes TX1 and TX2 of the polarizing beam splitter 42 are required not to be disposed at the angle of zero degrees, 45 degrees, and 90 degrees. That is, the angle θ may be greater than zero degrees and less than 45 degrees, or greater than 45 degrees and less than 90 degrees.

The ellipsometer 2 of the second example embodiment in the present disclosure may generate the interference fringe 51b on the image detector 50, and may obtain additional information by using the polarizing beam splitter 42 instead of the analyzer as the interference member 40. In this manner, the ellipsometer 2 may use a component which is unable to be used when using the analyzer for the detection. Therefore, it is possible to improve a signal-to-noise (S/N) ratio. It is also possible to form the interference fringe 51a and the interference fringe 51b having phases inverted from each other by 180 degrees. Accordingly, on the interference fringe 51 detected only using the image detector 50, a point having a small intensity, which is detected using the image detector 50, may be used as a point having a larger intensity. For example, a point corresponding to the position of a valley may be used as a point corresponding to the position of a mountain by detecting using the image detector 50. In other words, it is possible to complementarily use the points on the interference fringe detected using the image detector 50. Configuration and effect other than those described above may be provided in the first example embodiment.

Figure 14:
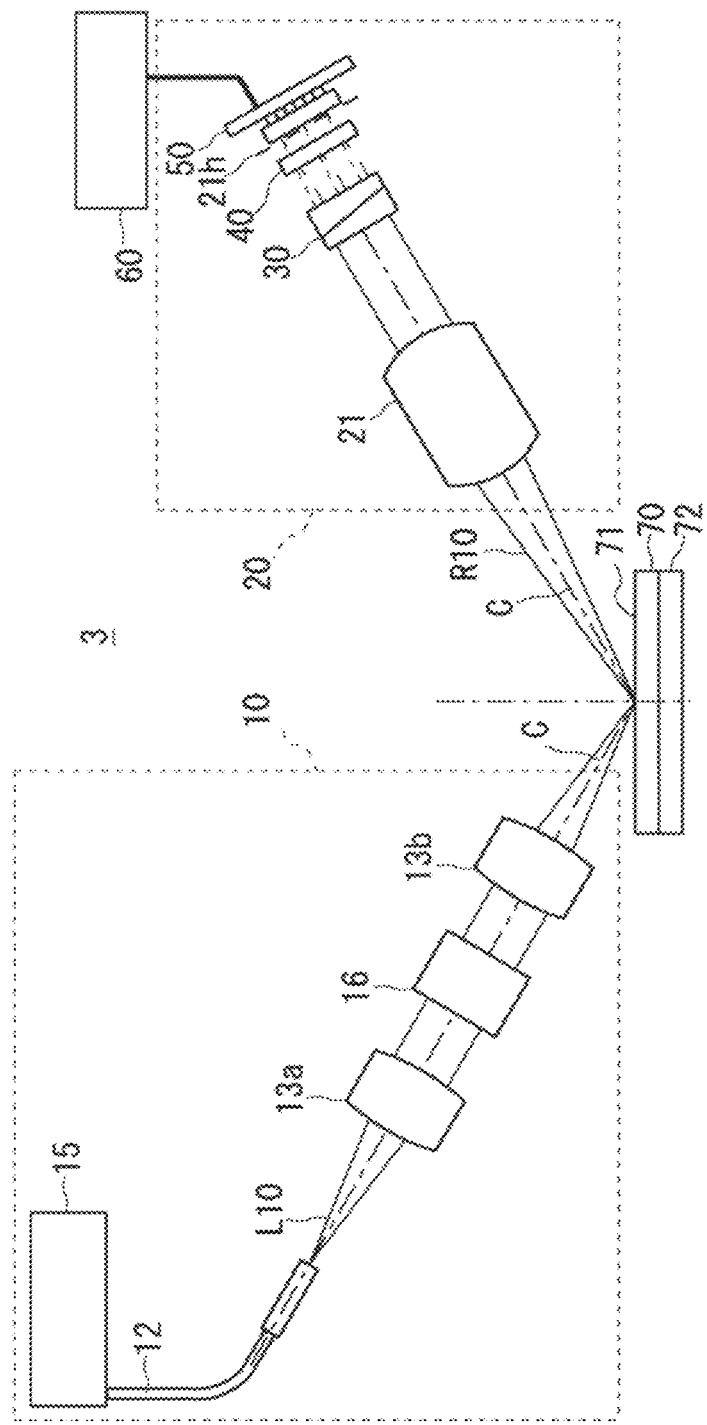
FIG. 14 is a side view illustrating an ellipsometer according to a third example embodiment.
Figure 15:
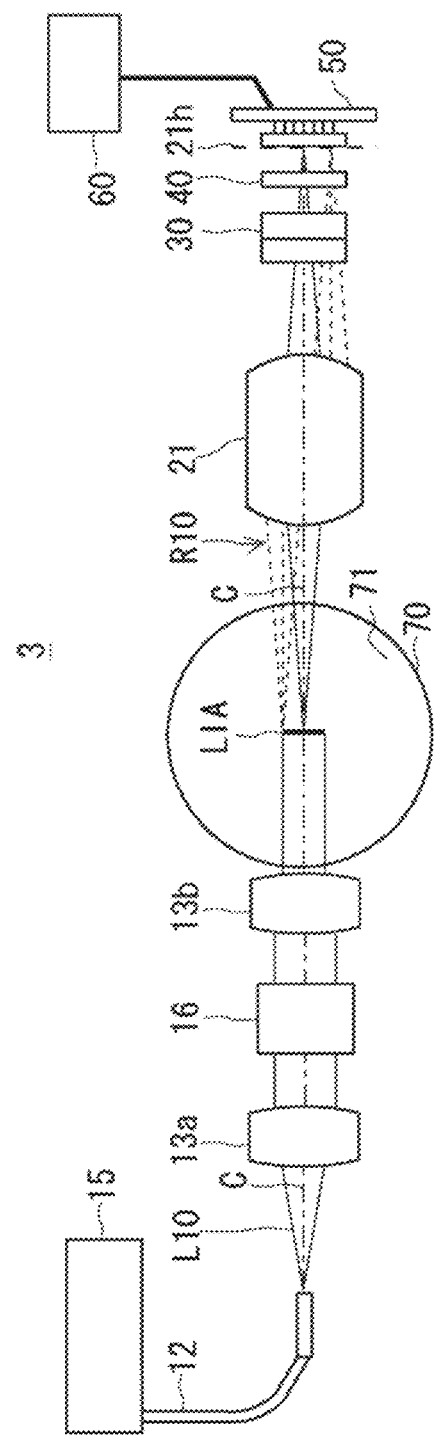
FIG. 15 is a top view illustrating the ellipsometer according to the third example embodiment.

Next, an ellipsometer according to a third example embodiment is described. The third example embodiment in the present disclosure may illuminate the linear illumination area LIA by using a coherent light source that emits a laser as the light source 11. FIG. 14 is a side view illustrating the ellipsometer according to the third example embodiment. FIG. 15 is a top view illustrating the ellipsometer according to the third example embodiment.

As shown in FIGS. 14 and 15, an ellipsometer 3 may include the illumination optical system 10, the light-receiving optical system 20, and the analysis device 60, like the ellipsometer of other example embodiments. The light-receiving optical system 20 and the analysis device 60 may correspond to those of other example embodiments.

The illumination optical system 10 may include a light source 15, the fiber 12, a conversion lens 13*a*, an illumination lens 13*b*, and a coherence reduction element 16.

The light source 15 may include a laser light source for example. For example, the light source 15 may generate laser light as the illuminated light L10. Therefore, the light source 15 may generate the illuminated light L10 including the linearly polarized light in the one direction.

The illuminated light L10 generated from the light source 15 may be incident on the conversion lens 13*a* through the fiber 12.

The conversion lens 13*a* may include a cylindrical lens or a toroidal mirror for example. The conversion lens 13*a* may be a combination of a plurality of lenses. The conversion lens 13*a* may convert the illuminated light L10 emitted from the fiber 12 to parallel light. The illuminated light L10 converted to the parallel light may be incident on the coherence reduction element 16.

The coherence reduction element 16 may allow the illuminated light L10 converted to the parallel light to be transmitted therethrough. Here, the coherence reduction element 16 may reduce the coherence of the illuminated light L10. When the illuminated light L10 is the laser light, the illuminated light L10 may become the parallel light in a direction of the linear illumination area LIA, and a spatial coherence may thus be too high. Therefore, unnecessary interference fringe or speckle may occur. Therefore, the coherence reduction element 16 may make an optical path length of the illuminated light L10 to be different based on the linear illumination area (LIA).

Figure 16:
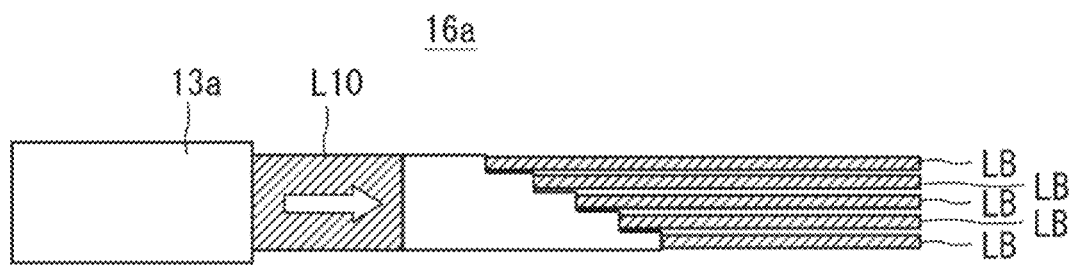
FIG. 16 is a top view illustrating a coherence reduction element using a wavefront splitting in the ellipsometer according to the third example embodiment.

FIG. 16 is a top view illustrating a coherence reduction element 16*a* using a wavefront splitting in the ellipsometer according to the third example embodiment. As shown in FIG. 16, the coherence reduction element 16*a* may include a staircase prism for example. The coherence reduction element 16*a* may reduce the spatial coherence by the wavefront splitting using the staircase prism. In detail, the coherence reduction element 16*a* may split the illuminated light L10 into a plurality of beams LBs in a direction in which the linear illumination area LIA extends orthogonally to the reflective plane when viewed from above. In addition, the coherence reduction element 16*a* may allow each split beam LB to have a different optical path length. Accordingly, the coherence reduction element 16*a* may appropriately adjust the spatial coherence of the illuminated light L10.

Figure 17:
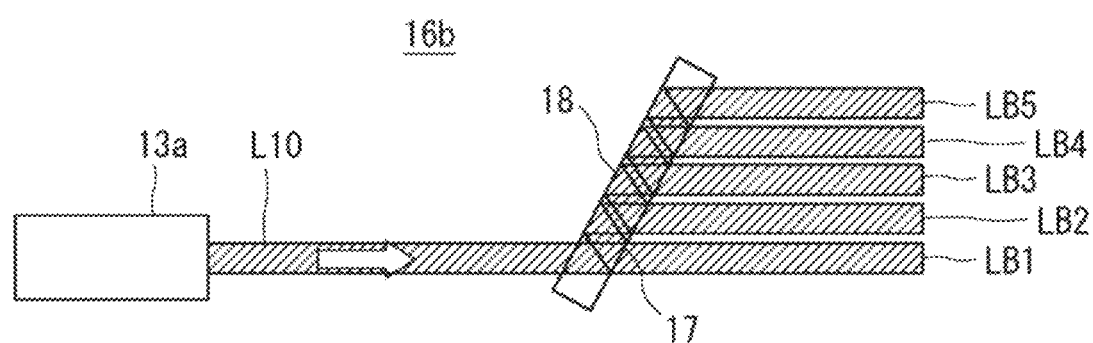
FIG. 17 is a top view illustrating another coherence reduction element using amplitude splitting in the ellipsometer according to the third example embodiment.

FIG. 17 is a top view illustrating another coherence reduction element 16*b* using an amplitude splitting in the ellipsometer according to third example embodiment. As shown in FIG. 17, the coherence reduction element 16*b* may include a half mirror film 17 and a reflective film 18. The coherence reduction element 16*b* may reduce the spatial coherence by amplitude splitting using the half mirror film 17 and the reflective film 18. In detail, the coherence reduction element 16*b* may form a plurality of beams by repeating light transmission and reflection on the half mirror film 17 and light reflection on the reflective film 18 several times. In this manner, the coherence reduction element 16*b* may make the optical path length of each beam to be different from each other.

For example, the coherence reduction element 16*b* may allow each beam to have a different optical path length including a beam LB1 transmitted through the half mirror film 17, a beam LB2 reflected from the half mirror film 17, reflected from the reflective film 18 and then transmitted through the half mirror film 17, a beam LB3 reflected twice from the half mirror film 17 and the reflective film 18 and then transmitted through the half mirror film 17, a beam LB4 reflected three times from the half mirror film 17 and the reflective film 18 and then transmitted through the half mirror film 17, and a beam LB5 reflected four times from the half mirror film 17 and the reflective film 18 and then transmitted through the half mirror film 17. Accordingly, the coherence reduction element 16*b* may appropriately adjust the spatial coherence of the illuminated light L10.

The illuminated light L10 transmitted through the coherence reduction element 16*a* and the 16*b* coherence reduction element may be incident on the illumination lens 13*b*. The illumination lens 13*b* may illuminate the measurement surface 71 using the illuminated light L10 including the linearly polarized light. The illumination lens 13*b* may illuminate the linear illumination area LIA using the illuminated light L10 having an appropriately adjusted spatial coherence.

According to the ellipsometer 3 of the third example embodiment in the present disclosure, the laser light source may be used as the light source 15. Therefore, it is possible to suppress unnecessary interference fringe or speckle. Configuration and effect other than those described above may be included in the first example embodiment, the second example embodiment, and the third example embodiment.

Figure 18:
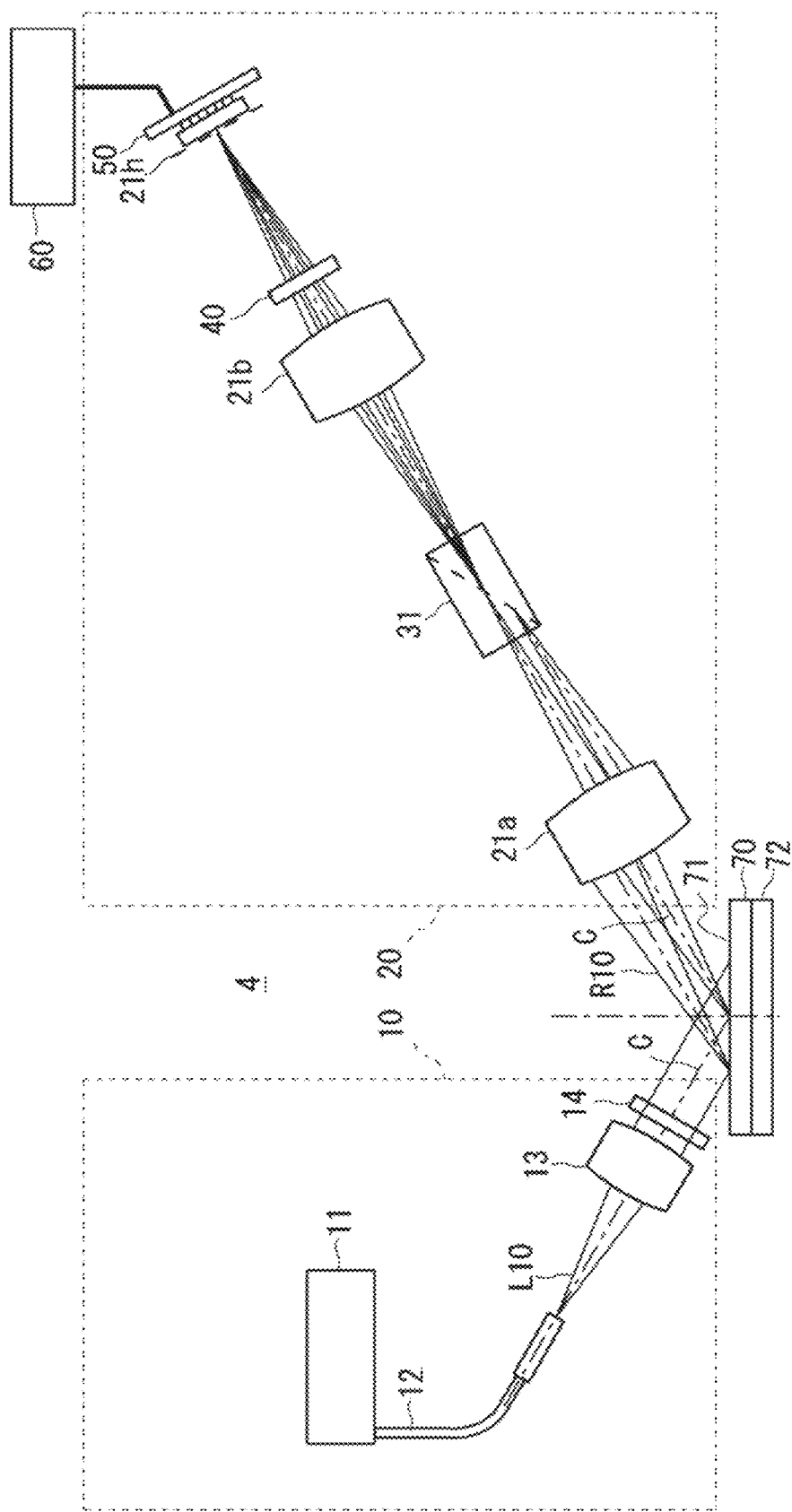
FIG. 18 is a side view illustrating an ellipsometer according to a fourth example embodiment.

Next, an ellipsometer according to a fourth example embodiment may have a configuration in which the Willaston prism is disposed on a conjugated surface of the measurement surface 71 of the sample 70, and information on the interference fringe is obtained in a time series. FIG. 18 is a side view illustrating the ellipsometer according to the fourth example embodiment.

Figure 19:
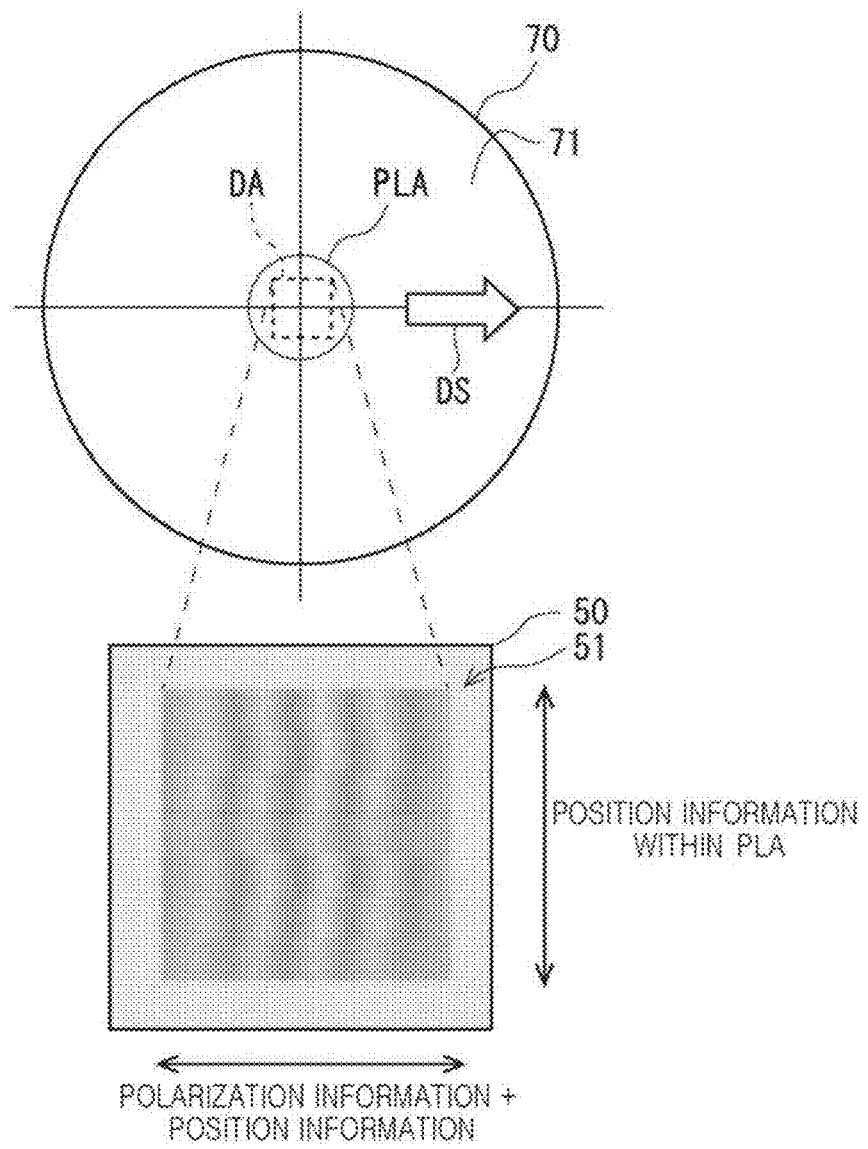
FIG. 19 is a view illustrating a planar illumination area on the measurement surface of the sample and the interference fringe generated by the light reflected from the planar illumination area in the ellipsometer according to the fourth example embodiment.

FIG. 19 is a view illustrating a planar illumination area on the measurement surface 71 of the sample 70 and the interference fringe 51 generated by the reflected light R10 from the planar illumination area in the ellipsometer according to the fourth example embodiment.

As shown in FIGS. 18 and 19, an ellipsometer 4 may include the illumination optical system 10, the light-receiving optical system 20, and the analysis device 60. The illumination optical system 10 may include the light source 11, the fiber 12, the illumination lens 13, and the polarizer 14, and has the same configuration as the first example embodiment. However, the illuminated light L10 of the fourth example embodiment in the present disclosure may illuminate a planar illumination area PIA on a plane, having a predetermined area on the measurement surface 71 of the sample 70. In detail, the illumination lens 13 may illuminate the measurement surface 71 by condensing the illuminated light L10 to a plane. A detection area DA detected by the image detector 50 may be included in the planar illumination area PIA.

The polarizer 14 may be disposed between the illumination lens 13 and the sample 70. Therefore, the illumination lens 13 may irradiate the illuminated light L10 to the polarizer 14 and condense the light on the measurement surface 71 to a plane through the polarizer 14.

The light-receiving optical system 20 may include a light-receiving lens 21a, a polarizing optical element 31, a relay lens 21b, the interference member 40, and the image detector 50. The light-receiving lens 21a may receive the reflected light R10 obtained by reflecting the illuminated light L10 including the linearly polarized light from the measurement surface 71 of the sample 70 to be transmitted therethrough. The light-receiving lens 21a may include a cylindrical lens or a toroidal minor, for example. The light-receiving lens 21a may be a combination of a plurality of lenses. The light-receiving lens 21a may allow the reflected light R10 to be transmitted therethrough and to be incident on the polarizing optical element 31.

The polarizing optical element 31 may include a Willaston prism, for example. The polarizing optical element 31 may be disposed so that a bonding surface of the Willaston prism coincides with the conjugated surface of the measurement surface 71 in the light-receiving optical system 20. Meanwhile, images of the P-polarized light and S-polarized light may be formed at the same point on the image detector 50.

The polarizing optical element 31 may split the P-polarized light and the S-polarized light from each other within the incident plane to form the interference fringe 51 on the image detector 50. When viewed from above, orthogonal to the reflective plane, the interference fringe 51 formed on the image detector 50 may include position information on the measurement surface 71. Meanwhile, the interference fringe 51 may include both polarization information and position information on the measurement surface 71 when viewed from the side.

Figure 20:
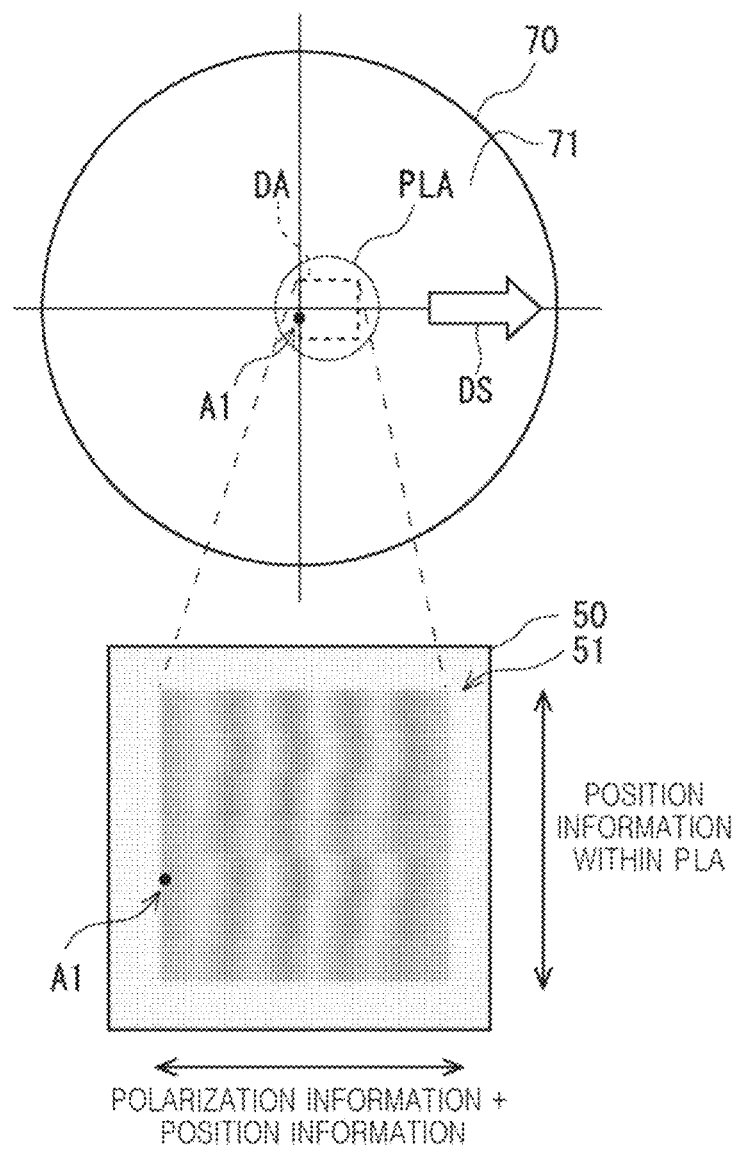
FIG. 20 is another view illustrating the planar illumination area on the measurement surface of the sample and the interference fringe generated by the light reflected from the planar illumination area in the ellipsometer according to the fourth example embodiment.
Figure 21:
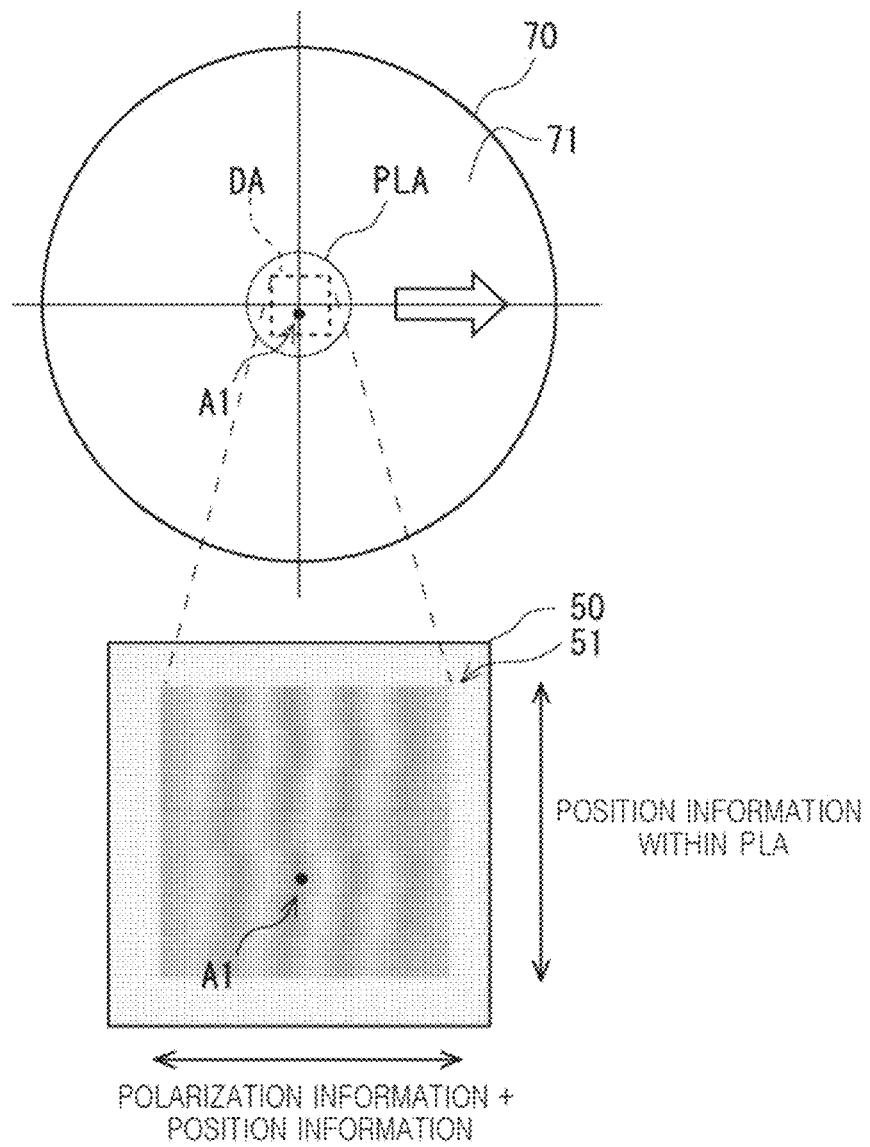
FIG. 21 is another view illustrating the planar illumination area on the measurement surface of the sample and the interference fringe generated by the light reflected from the planar illumination area in the ellipsometer according to the fourth example embodiment.
Figure 22:
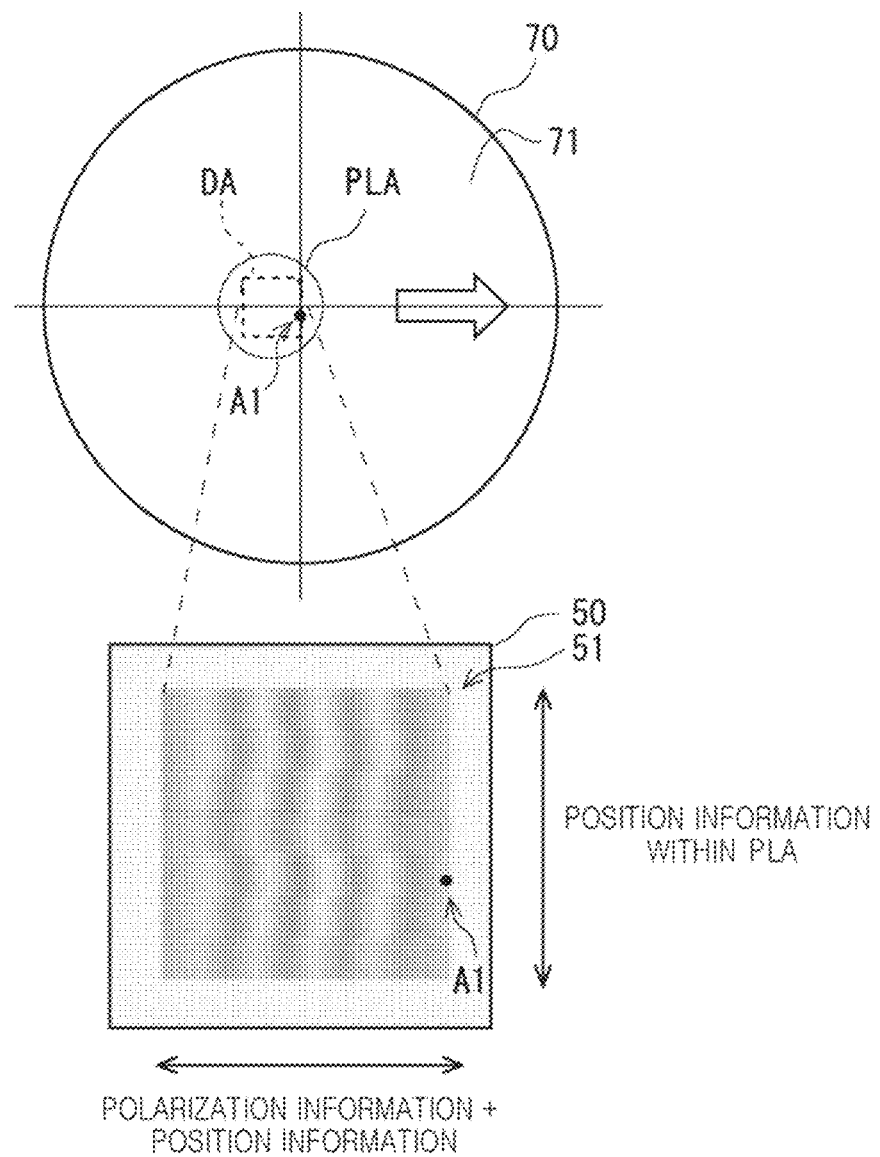
FIG. 22 is another view illustrating the planar illumination area on the measurement surface of the sample and the interference fringe generated by the light reflected from the planar illumination area in the ellipsometer according to the fourth example embodiment.
Figure 23:
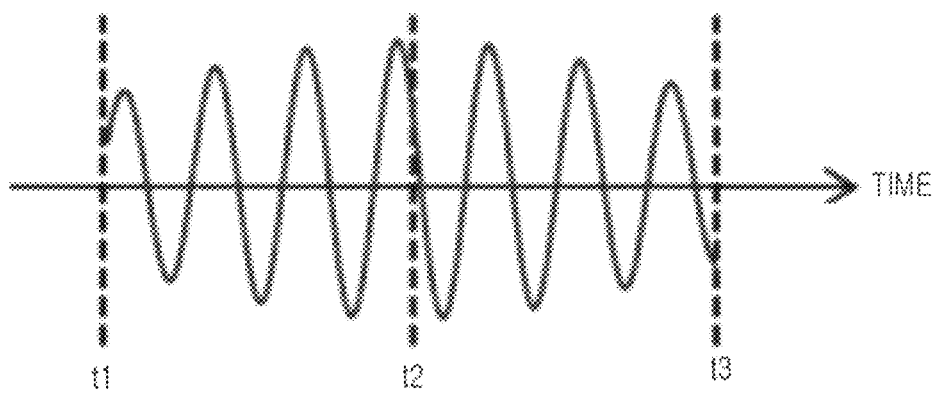
FIG. 23 is a view illustrating intensity of an interference fringe at a predetermined point when a stage is scanned in a scanning direction in the ellipsometer according to the fourth example embodiment, in which a horizontal axis represents time, and a vertical axis represents intensity of the reflected light.

FIGS. 20 through 22 are other views, each illustrating the planar illumination area PLA on the measurement surface 71 of the sample 70 and the interference fringe 51 generated by the reflected light R10 from the planar illumination area PLA in the ellipsometer according to the fourth example embodiment. FIG. 23 is a view illustrating intensity of the interference fringe 51 at a predetermined point when the stage 72 is scanned in the scanning direction DS in the ellipsometer according to the fourth example embodiment, in which a horizontal axis represents time, and a vertical axis represents intensity of the reflected light R10. FIG. 20 shows the interference fringe at t1, FIG. 21 shows the interference fringe at t2, and FIG. 22 shows the interference fringe at t3.

In left and right directions on the image detector 50, the polarization information and position information on the measurement surface 71 may be mixed with each other. However, as shown in FIG. 23, interference fringe information including only the polarization information may be extracted by performing the measurement while scanning the measurement surface 71 in the scanning direction DS, and measuring the amount of light at the same point on the measurement surface 71 (e.g., point A1).

According to the ellipsometer 4 of the fourth example embodiment in the present disclosure, the illuminated light L10 may illuminate the planar illumination area PIA on a plane, and the ellipsometry coefficients $\Psi$ and $\Delta$ of the two-dimensional region within the measurement surface 71 may thus be obtained at a high speed. In addition, the ellipsometer 4 may use the Willaston prism as the polarizing optical element 31 to improve the degree of freedom in optical design. Configuration and effect other than those described above may be included in the descriptions of the first example embodiment, the second example embodiment, the third example embodiment, and the fourth example embodiment.

As set forth above, embodiments of the present disclosure may provide an ellipsometer capable of improving throughput thereof in measuring the ellipsometry coefficients $\Psi$ and $\Delta$, and the inspection device for inspecting a semiconductor device.

While example embodiments have been shown and described above, it will be apparent to those skilled in the art that modifications and variations could be made without departing from the scope of the present disclosure.

What is claimed is:

1. An ellipsometer comprising:
a polarizing optical element, comprising a prism, that is configured to split reflected light into two linearly polarized components of light having polarization directions orthogonal to each other, the reflected light generated by reflecting illuminated light, including linearly polarized light that is polarized in one direction, from a measurement surface of a sample;
an interference member, comprising at least one body, that is configured to form at least one interference fringe in which the two linearly polarized components of light interfere with each other in directions different from the polarization directions;
an image detector configured to detect the at least one interference fringe; and
an analysis device comprising at least one processor, the analysis device configured to calculate ellipsometry coefficients $\Psi$ and $\Delta$ based on the at least one interference fringe that is detected.

2. The ellipsometer of claim 1, wherein an optical axis of the illuminated light incident on the measurement surface and an optical axis of the reflected light reflected from the measurement surface are inclined with respect to a normal of the measurement surface.

3. The ellipsometer of claim 2, further comprising:
a light source that is configured to generate the illuminated light;
a polarizer that is configured to receive the illuminated light and transmit the illuminated light, including the linearly polarized light that is polarized in the one direction, therethrough;
an illumination lens configured to illuminate the measurement surface using the illuminated light; and
a light-receiving lens that is configured to allow the reflected light to be transmitted therethrough such that the reflected light is incident on the polarizing optical element.

4. The ellipsometer of claim 3, wherein the illuminated light is configured to illuminate a linear illumination area disposed on a line extending with respect to the measurement surface,
the image detector is disposed at a pupil conjugate position conjugated to a pupil position of the light-receiving lens when viewed from a side in a direction orthogonal to an incident plane, and disposed in a position of an image above the measurement surface when viewed from above, orthogonal to a reflective plane, and
the incident plane includes the optical axis of the illuminated light and the optical axis of the reflected light, and the reflective plane includes the optical axis of the reflected light and is perpendicular to the incident plane.

5. The ellipsometer of claim 3, wherein the illuminated light illuminates a planar illumination area, having a predetermined area on the measurement surface.

6. The ellipsometer of claim 5, wherein the prism of the polarizing optical element is a Wollaston prism.

7. The ellipsometer of claim 2, further comprising:
a laser light source configured to generate the illuminated light, including the linearly polarized light that is polarized in the one direction;
an illumination lens configured to illuminate the measurement surface using the illuminated light; and
a light-receiving lens configured to allow the reflected light to be transmitted therethrough such as to be incident on the polarizing optical element.

8. The ellipsometer of claim 7, wherein the illuminated light illuminates a linear illumination area disposed on a line extending with respect to the measurement surface,
wherein the image detector is disposed at a pupil conjugate position conjugated to a pupil position of the light-receiving lens when viewed from a side, orthogonal to an incident plane, and disposed in a position of an image above the measurement surface when viewed from above, orthogonal to a reflective plane, and
wherein the incident plane includes the optical axis of the illuminated light and the optical axis of the reflected light, and the reflective plane includes the optical axis of the reflected light and is perpendicular to the incident plane.

9. The ellipsometer of claim 8, further comprising:
a conversion lens configured to convert the illuminated light into parallel light; and
a coherence reduction element that is configured to allow the illuminated light converted to the parallel light to be transmitted therethrough,
wherein the coherence reduction element is configured to split the illuminated light into a plurality of beams in a direction in which the linear illumination area extends when viewed from above, orthogonal to the reflective plane, such that each of the plurality of beams have a different optical path length.

10. The ellipsometer of claim 9, wherein the coherence reduction element is a staircase prism having different lengths in an optical axis direction, in a shape of a staircase, in the direction in which the linear illumination area extends when viewed from above, orthogonal to the reflective plane, and
the staircase prism is configured to allow the illuminated light to be transmitted therethrough, such that each of the plurality of beams is transmitted through a respective stair portion from among a plurality of stair portions of the staircase prism that have a different length in the optical axis direction from each other, thereby allowing each of the plurality of beams to have the different optical path length from each other.

11. The ellipsometer of claim 9, wherein the coherence reduction element comprises a half mirror film and a reflective film, and allows each beam of the plurality of beams to have the different optical path length from each other, the plurality of beams includes:
a first beam that is transmitted through the half mirror film,
a second beam reflected from the half mirror film, reflected from the reflective film, and then transmitted through the half mirror film, and
an n-th beam reflected a plurality of N times from the half mirror film and the reflective film, and then transmitted through the half mirror film.

12. The ellipsometer of claim 7, wherein the illumination lens comprises a cylindrical lens.

13. The ellipsometer of claim 1, wherein the at least one body of the interference member comprises a polarizing plate that is configured to allow the two linearly polarized components of light, each polarized in a direction inclined by 45 degrees with respect to the polarization directions, to be transmitted therethrough, and
the image detector is configured to detect the at least one interference fringe of the two linearly polarized components of light that are transmitted through the polarizing plate.

14. The ellipsometer of claim 1, wherein
the at least one interference fringe is a plurality of interference fringes,
the at least one body of the interference member comprises a polarizing beam splitter that is configured to split each of the two linearly polarized components of light into a first component and a second component,
the first component comprises a component polarized in a first direction inclined with respect to each of the polarization directions by a predetermined angle,
the second component comprises a component polarized in a second direction inclined 90 degrees with respect to the first direction, and
the image detector is configured to detect a first interference fringe, from among the plurality of interference fringes, between the first component of each of the two linearly polarized components of light, and a second interference fringe, from among the plurality of interference fringes, between the second component of each of the two linearly polarized components of light.

15. The ellipsometer of claim 14, wherein the predetermined angle is greater than zero degrees and less than 45 degrees, or greater than 45 degrees and less than 90 degrees.

16. The ellipsometer of claim 1, wherein prism of the polarizing optical element is a Nomarski prism.

17. The ellipsometer of claim 1, wherein the sample is disposed on a stage that is configured to move in a scanning direction parallel to an incident plane and the measurement surface, the incident plane includes an optical axis of the illuminated light and an optical axis of the reflected light, and
the image detector detects the at least one interference fringe scanned in the scanning direction.

18. The ellipsometer of claim 1, wherein the two linearly polarized components of light are P-polarized light and S-polarized light.

19. The ellipsometer of claim 1, wherein the illuminated light comprises white light, and
the analysis device is configured to perform a Fourier transform on the at least one interference fringe, and calculate the ellipsometry coefficients $\Psi$ and $\Delta$ from the at least one interference fringe that is transformed with the Fourier transform.

20. An inspection device for inspecting a semiconductor device, the inspection device comprising an ellipsometer,
wherein the ellipsometer comprises:
a polarizing optical element, comprising a prism, that is configured to split reflected light into two linearly polarized components of light having polarization directions orthogonal to each other, the reflected light generated by reflecting illuminated light, including linearly polarized light, from a measurement surface of a sample,;
an interference member, comprising at least one body, that is configured to form an interference fringe in which the two linearly polarized components of light interfere with each other in directions different from the polarization directions;

an image detector configured to detect the interference fringe; and an analysis device comprising at least one processor, the analysis device configured to calculate ellipsometry coefficients $\Psi$ and $\Delta$ based on the interference fringe that is detected.

* * * * *